United States Patent
Yamashita et al.

(10) Patent No.: US 8,695,766 B2
(45) Date of Patent: Apr. 15, 2014

(54) SHOCK ABSORBER

(75) Inventors: Mikio Yamashita, Yokohama (JP);
Fumiyuki Yamaoka, Sagamihara (JP);
Masaru Kouyama, Ayase (JP); Atsushi Maeda, Fujisawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 100 days.

(21) Appl. No.: 13/423,698

(22) Filed: Mar. 19, 2012

(65) Prior Publication Data

US 2012/0248670 A1 Oct. 4, 2012

(30) Foreign Application Priority Data

Mar. 31, 2011 (JP) ................. P2011-080771

(51) Int. Cl.
*F16F 9/49* (2006.01)
(52) U.S. Cl.
USPC ....................................... 188/284; 188/282.5
(58) Field of Classification Search
USPC ........ 188/280, 281, 282.8, 282.9, 283, 283.1, 188/286, 287, 316, 317, 322.22; 267/33, 267/34, 221–226, 289, 291
See application file for complete search history.

(56) References Cited

U.S. PATENT DOCUMENTS

| | | | |
|---|---|---|---|
| 6,220,409 B1 * | 4/2001 | Deferme ................... | 188/322.15 |
| 6,352,145 B1 * | 3/2002 | DeMolina et al. ............ | 188/281 |
| 6,626,274 B2 * | 9/2003 | Pfundstein et al. ........... | 188/284 |
| 6,651,787 B2 * | 11/2003 | Grundei ......................... | 188/280 |
| 7,032,727 B2 * | 4/2006 | Vanspauwen ................. | 188/284 |
| 7,431,135 B2 * | 10/2008 | Vanbrabant ................ | 188/282.5 |
| 2011/0214953 A1 * | 9/2011 | Maeda et al. ................. | 188/266 |
| 2012/0160624 A1 * | 6/2012 | Katayama et al. ............ | 188/314 |
| 2013/0048451 A1 * | 2/2013 | Yamashita ................... | 188/280 |

FOREIGN PATENT DOCUMENTS

JP 2006-177531 7/2006

\* cited by examiner

*Primary Examiner* — Christopher Schwartz
(74) *Attorney, Agent, or Firm* — Nixon & Vanderhye P.C.

(57) ABSTRACT

A shock absorber includes first passages configured to communicate two chambers to flow a working fluid therebetween by movement of a piston, and a second passage configured to communicate with one chamber of the two chambers. The first passages have damping valves configured to suppress a flow of the working fluid generated by movement of the piston to generate a damping force. The second passage has a variable orifice having an area adjusted by an elastic member when a piston rod moves in an extension direction, a pressure chamber installed in series with the variable orifice, and a free piston configured to vary a volume of the pressure chamber by movement of the piston.

4 Claims, 15 Drawing Sheets

SHOCK ABSORBER

BACKGROUND OF THE INVENTION

1. Field of the Invention

The present invention relates to a shock absorber.

This patent application claims priority of Japanese Patent Application No. 2011-080771, filed on Mar. 31, 2011 in the Japanese Patent Office, the entire contents of which are hereby incorporated by reference.

2. Description of Related Art

A shock absorber may have a configuration in which, when a piston rod is extended near a stroke end, an inner spring is compress to suppress collision of a piston (for example, see Japanese Unexamined Patent Application, First Publication No. 2006-177531).

When a member configured to suppress full extension of the piston rod, for example, a spring disclosed in Japanese Unexamined Patent Application, First Publication No. 2006-177531, is used in the shock absorber, as the spring constant is increased when the spring is compressed and the spring is in a natural state, the vibration-damping property of a vehicle body, i.e., a damping force of the shock absorber, is reduced.

SUMMARY OF THE INVENTION

An object of the present invention is to provide a shock absorber capable of generating a desired damping force even when a member configured to suppress full extension of a piston rod is used.

According to a first aspect of the present invention, a shock absorber includes a first passage configured to communicate with two chambers such that a working fluid flows between the two chambers by movement of a piston, and a second passage configured to communicate with one chamber of the two chambers. The first passage has a damping valve configured to suppress flow of the working fluid generated by movement of the piston to generate a damping force. The second passage has a variable orifice having an area adjusted by an elastic member when a piston rod is moved in an extension direction, a pressure chamber installed serially with respect to the variable orifice, and a free piston configured to vary a volume of the pressure chamber by movement of the piston.

According to an aspect of the present invention, even when a member configured to suppress full extension of a piston rod is used, a desired damping force can be generated.

DETAILED DESCRIPTION OF THE INVENTION

Figure 1:
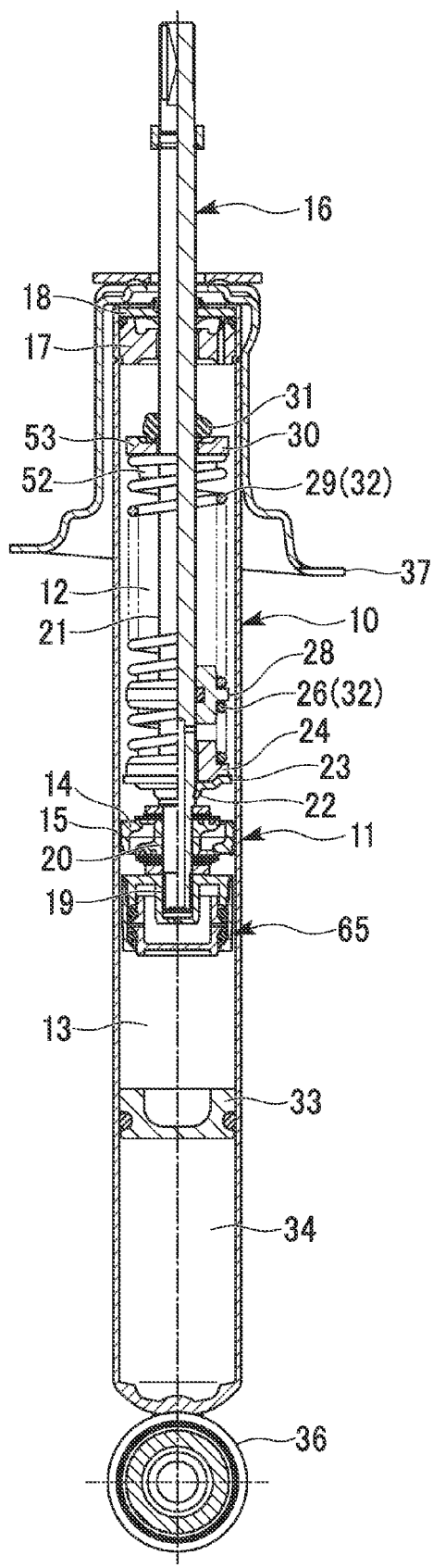
FIG. 1 is a cross-sectional view showing a shock absorber in accordance with a first embodiment of the present invention.

Hereinafter, major problems solved by embodiments including the above-mentioned problems will be described.

[Improvement of Characteristics]

When damping force characteristics (a damping force with respect to a piston speed) are varied according to a vibration state, characteristic setting such as smoother variation is required. This is because, when switching of characteristics in which a small damping force is generated and characteristics in which a large damping force is generated abruptly occurs, since the damping force generated in reality is also abruptly switched, ride comfort of a vehicle is also degraded, and further, when the switching of the damping force is generated during steering of the vehicle, behavior of the vehicle may become unstable and a driver may feel a sense of incompatibility with respect to the driver's steering. For this reason, as disclosed in Japanese Unexamined Patent Application, First Publication No. 2006-177531, while characteristic setting in which the damping force is more smoothly varied has been considered, improvement in characteristics is still required.

[Suppression of Increase in Size]

As disclosed in Japanese Unexamined Patent Application, First Publication No. 2006-177531, as two chambers are partitioned in a cylinder and, in addition to a piston having a mechanism configured to generate a damping force, a free piston installed at one side of the piston and vertically movable in a housing is provided, various improved cylinder apparatuses have been developed to obtain damping force characteristics corresponding to a wide range of vibration frequencies. A common task in these cylinder apparatuses may be an increase in length of the cylinder apparatus in an axial direction thereof, because a region in which the free piston vertically moves is necessary. When the cylinder apparatus becomes larger, a degree of attachment freedom to a vehicle body is decreased, and thus, an increase in axial length of the cylinder apparatus is an important problem to be solved.

[Reduction in Number of Parts]

As disclosed in Japanese Unexamined Patent Application, First Publication No. 2006-177531, since components such as the housing or the free piston are provided in addition to the piston, the number of parts is increased. An increase in the number of parts exerts influences on productivity, durability, reliability, and so on. For this reason, a reduction in the number of parts is required while showing desired characteristics, for example, characteristics in which damping force characteristics corresponding to a wide range of vibration frequencies are obtained.

Hereinafter, embodiments of the present invention will be described with reference to the accompanying drawings.

First Embodiment

A first embodiment of the present invention will be described with reference to FIGS. 1 to 7C. For the convenience of easy understanding in the following description, a lower side of each of the drawings is referred to as one side and an upper side of each of the drawings is referred to as the other side.

As shown in FIG. 1, a shock absorber of the first embodiment is a mono-tube type hydraulic shock absorber, and has a bottomed cylinder 10 in which a hydraulic fluid as a working fluid is hermetically contained. A piston 11 is slidably inserted into the cylinder 10. The inside of the cylinder 10 is partitioned into two chambers of an upper chamber 12 and a lower chamber 13 by the piston 11. The piston 11 includes a piston main body 14, an annular sliding member 15 mounted on an outer circumference of the piston main body 14, and an insertion portion, which is connected to the piston main body 14, of a piston rod 16 into the piston main body 14.

The piston main body 14 is connected to one end of the piston rod 16. The other end of the piston rod 16 is inserted into a rod guide 17 and an oil seal 18, which are mounted on an opening side of the cylinder 10, to extend to the outside of the cylinder 10. The opening side of the cylinder 10 is swaged inside, and thus, the oil seal 18 and the rod guide 17 are locked by the swaged portion.

The piston rod 16 has an attachment shaft portion 20 formed at an insertion end into the cylinder 10 and to which the piston main body 14 is attached. The other portion of the piston rod 16 configures a main shaft portion 21 having a larger diameter than the attachment shaft portion 20. The attachment shaft portion 20 has a male thread 19 formed at an outer circumference thereof opposite to the main shaft portion 21. A locking groove 22 is formed at a position of the main shaft portion 21 adjacent to the attachment shaft portion 20. An inner circumference of a retainer 23 enlarged outward from the main shaft portion 21 in a radial direction thereof is swaged in the locking groove 22.

An annular spring mount 24 is disposed at the retainer 23 opposite to the piston 11. An auxiliary spring 26 formed of a coil spring is disposed at the spring mount 24 opposite to the retainer 23. In addition, an annular intermediate stopper 28 is disposed opposite to the spring mount 24 of the auxiliary spring 26. A rebound spring main body 29 formed of a coil spring is disposed at the intermediate stopper 28 opposite to the auxiliary spring 26. Further, an annular spring mount 30 is disposed at the rebound spring main body 29 opposite to the intermediate stopper 28. An annular shock absorbing body 31 formed of an elastic material is installed at the spring mount 30 opposite to the rebound spring main body 29. Furthermore, the spring mount 24, the auxiliary spring 26, the intermediate stopper 28, the rebound spring main body 29, the spring mount 30 and the shock absorbing body 31 are installed to be movable with respect to the piston rod 16 in an axial direction thereof.

When the piston rod 16 moves in a direction projecting from the cylinder 10, the spring mount 24, the auxiliary spring 26, the intermediate stopper 28, the rebound spring main body 29, the spring mount 30 and the shock absorbing body 31 move toward the rod guide 17 together with the retainer 23 fixed to the piston rod 16, so that the shock absorbing body 31 is in contact with the rod guide 17 at a predetermined position. When the piston rod 16 further moves in the projecting direction, the shock absorbing body 31 and the spring mount 30 are stopped with respect to the cylinder 10. As a result, the moving retainer 23 and the spring mount 30 approach each other. Accordingly, the spring mount 30 and the intermediate stopper 28 reduce the length of the rebound spring main body 29 therebetween, and the intermediate stopper 28 and the spring mount 24 reduce the length of the auxiliary spring 26 therebetween. Accordingly, the rebound spring main body 29 and the auxiliary spring 26 installed in the cylinder 10 resiliently act with the piston rod 16 to suppress full extension of the piston rod 16. The rebound spring main body 29 and the auxiliary spring 26 constitute a rebound spring (elastic member) 32 configured to suppress the full extension of the piston rod 16. In addition, as the rebound spring 32 resists the full extension of the piston rod 16, a lift of a wheel at an inner circumference during a turn of a vehicle is suppressed to suppress the roll amount of a vehicle body. When the intermediate stopper 28 maximally moves toward the retainer 23, the intermediate stopper 28 is in contact with the spring mount 24 locked in the retainer 23 to be stopped with respect to the piston rod 16.

A partition body 33 configured to partition the lower chamber 13 is slidably installed in the cylinder 10 at a bottom side of the cylinder 10 rather than the piston 11. A hydraulic fluid is hermetically contained in the upper chamber 12 and the lower chamber 13 in the cylinder 10. A gas of a high pressure (about 20 to 30 atmospheric pressure) is hermetically contained in a chamber 34 partitioned from the lower chamber 13 by the partition body 33.

For example, one side of the above-described shock absorber is supported by the vehicle body, and the other side of the shock absorber is fixed to a wheel side. Specifically, the piston rod 16 is connected to the vehicle body side. In addition, a mounting eye 36 attached to a bottom of the cylinder 10 opposite to a protrusion side of the piston rod 16 is connected to the wheel side. Here, a suspension spring (not shown) is interposed between the spring mount 37 fixed to the cylinder 10 at a side in which the piston rod 16 protrudes and the vehicle body. Further, in contrast, the other side of the shock absorber may be supported by the vehicle body and the one side of the shock absorber may be fixed to the wheel side.

When the wheels are vibrated as the vehicle runs, positions of the cylinder 10 and the piston rod 16 are relatively varied according to the vibrations. However, the variations are suppressed by the fluid resistance of a flow channel formed in the piston 11. As will be described below in detail, the fluid resistance of the flow channel formed in the piston 11 is configured to be varied according to the speed or amplitude of the vibrations. As the vibrations are suppressed, ride comfort is improved. In addition to the vibration generated by the wheels, an inertial force or a centrifugal force generated in the vehicle body is also applied between the cylinder 10 and the piston rod 16 as the vehicle runs. For example, as the direction of travel is varied according to a steering wheel operation, a centrifugal force is generated from the vehicle body, and a force based on the centrifugal force is applied between the cylinder 10 and the piston rod 16. As will be described below, the shock absorber of the present embodiment has preferable characteristics with respect to the vibrations based on the force generated from the vehicle body as the vehicle runs, and can obtain high stability in driving of the vehicle.

Figure 2:
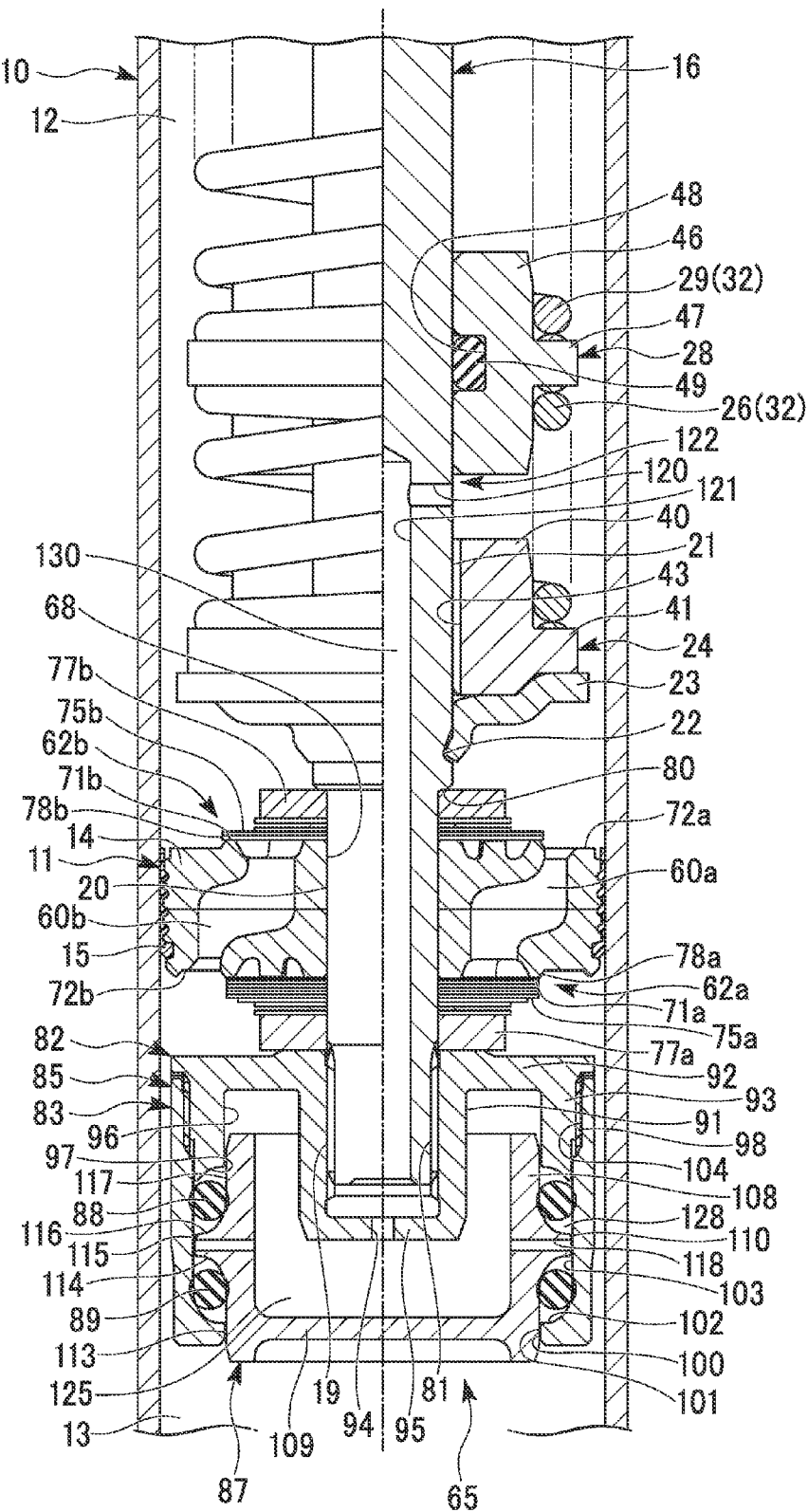
FIG. 2 is a cross-sectional view showing major parts of the shock absorber in accordance with the first embodiment of the present invention.

As shown in FIG. 2, the spring mount 24 has a cylindrical portion 40 with a substantially cylindrical shape, and an annular flange portion 41 projecting outward from one axial end of the cylindrical portion 40 in a radial direction. In addition, a plurality of grooves 43 extending in the axial direction are formed in an inner circumference of the cylindrical portion 40 at predetermined intervals. The spring mount 24 is configured such that the flange portion 41 is formed adjacent to the retainer 23. A main shaft portion 21 of the piston rod 16 is inserted into the inner circumference side of the cylindrical portion 40. Accordingly, the spring mount 24 is slidably supported by the main shaft portion 21 of the piston rod 16. In addition, the spring mount 24 contacts the retainer 23 at the flange portion 41 and the cylindrical portion 40, while one end of the auxiliary spring 26 contacts one side of the flange portion 41 opposite to the retainer 23.

The intermediate stopper 28 has a cylindrical portion 46 with a substantially cylindrical shape, and an annular flange portion 47 projecting outward in a radial direction from a central position in an axial direction of the cylindrical portion 46. In addition, an annular groove 48 having an annular shape concaved outward in radial direction is formed in a central position in an axial direction of an inner circumference of the cylindrical portion 46. A seal ring 49 is disposed in the annular groove 48. The main shaft portion 21 of the piston rod 16 is inserted into the inner circumference sides of the cylindrical portion 46 and the seal ring 49 of the intermediate stopper 28. Accordingly, the intermediate stopper 28 is slidably supported by the main shaft portion 21 of the piston rod 16. The intermediate stopper 28 brings the other end of the auxiliary spring 26 in contact with one end surface in the axial direction of the flange portion 47. In addition, the intermediate stopper 28 brings one end of the rebound spring main body 29 in contact with the other end surface in the axial direction of the flange portion 47.

As shown in FIG. 1, the spring mount 30 has a tubular portion 52 with a tapered shape, and an annular flange portion 53 projecting outward from a large diameter side of the tubular portion 52 in a radial direction. The spring mount 30 is configured so that the flange portion 53 is formed at one side thereof opposite to the rebound spring main body 29. The main shaft portion 21 of the piston rod 16 is inserted inside the tubular portion 52. Accordingly, the spring mount 30 is slidably supported by the main shaft portion 21 of the piston rod 16. The spring mount 30 brings the other end of the rebound spring main body 29 in contact with the flange portion 53 thereof.

As shown in FIG. 2, a plurality of passages (a first passage) 60*a* (since FIG. 2 is a cross-sectional view, only one is shown) and a plurality of passages (a first passage) 60*b* (since FIG. 2 is a cross-sectional view, only one is shown) are formed in the piston main body 14. The passages 60*a* communicate the upper chamber 12 with the lower chamber 13. A hydraulic fluid flows from the passages 60*a* from the upper chamber 12 to the lower chamber 13 when the piston 11 moves toward the upper chamber 12 side, i.e., during an extension stroke. The hydraulic fluid flows from the passages 60*b* from the lower chamber 13 to the upper chamber 12 when the piston 11 moves toward the lower chamber 13 side, i.e., during a compression stroke. The passages 60*a*, which constitute half of the passages, are formed in a circumferential direction of the piston 11 at the same pitch with the passages 60*b* interposed therebetween. Each of the passages 60*a* is opened at an outer side in a radial direction of one side in the axial direction of the piston 11 (an upper side of FIG. 1), and opened at an inner side in the radial direction of the other side in the axial direction (a lower side of FIG. 1).

In addition, a damping valve 62*a* configured to generate a damping force is installed at the passages 60*a*, which constitute half of the passages. The damping valve 62*a* is disposed at the lower chamber 13 side of the piston 11 in the axial direction. The passages 60*a* constitute passages of an extension side through which the hydraulic fluid passes when the piston 11 moves toward the extension side through which the piston rod 16 extends out of the cylinder 10. The damping valve 62*a* installed with respect to the passages 60*a* constitutes the damping valve of the extension side to regulate a flow of the hydraulic fluid through the passages 60*a* of the extension side to generate a damping force.

In addition, the passages 60*b*, which constitute the other half of the passages, are formed in the circumferential direction at the same pitch with the passages 60*a* interposed therebetween. The passages 60*b* are opened at an outer side in the radial direction of the other side in the axial direction of the piston 11 (a lower side of FIG. 1) and opened at an inner side in the radial direction of one side in the axial direction (an upper side of FIG. 1).

A damping valve 62*b* configured to generate a damping force is installed at the passages 60*b*, which constitute the other half of the passages. The damping valve 62*b* is disposed at the upper chamber 12 side of the piston 11 in the axial direction. The passages 60*b* constitute passages of a compression side through which the hydraulic fluid passes when the piston 11 moves toward the compression side through which the piston rod 16 enters the cylinder 10. The damping valve 62*b* installed with respect to the passages 60*b* constitutes the damping valve of the compression side to regulate the flow of the hydraulic fluid of the passages 60*b* of the compression side to generate a damping force.

A damping force varying mechanism 65 is attached to a farther end side of the piston rod 16 than the piston 11 of the attachment shaft portion 20.

The piston main body 14 has substantially a disc shape. An insertion hole 68 is formed in the center of the piston main body 14. The insertion hole 68 passes through the piston main body 14 in the axial direction so that the attachment shaft portion 20 of the piston rod 16 is inserted therethrough.

A seat portion 71*a* having an annular shape and constituting the damping valve 62*a* is formed in an end of the piston main body 14 at the lower chamber 13 side at a position of one end opening of the passages 60*a* of the extension side. A seat portion 71*b* having an annular shape and constituting the damping valve 62*b* is formed in an end of the piston main body 14 at the upper chamber 12 side at a position of one end opening of the passages 60*b* of the compression side.

In the piston main body 14, an annular step portion 72*b* having a lower height in the axial direction than the seat portion 71*a* is formed in a portion thereof opposite to the insertion hole 68 of the seat portion 71*a*. The other end of the passages 60b of the compression side is opened at the position of the step portion 72b. In addition, similarly, in the piston main body 14, an annular step portion 72a having a lower height in the axial direction than the seat portion 71b is formed in a portion thereof opposite to the insertion hole 68 of the seat portion 71b. The other end of the passages 60a of the extension side is opened at the position of the step portion 72a.

The damping valve 62a includes the seat portion 71a, and an annular disc 75a that is capable of being simultaneously seated on the entire seat portion 71a. The damping valve 62a constitutes a disc valve. The disc 75a is constituted by overlapping a plurality of annular single discs each other. An annular valve regulating member 77a having a smaller diameter than the disc 75a is disposed at one side of the disc 75a opposite to the piston main body 14.

A fixed orifice 78a is formed in the damping valve 62a between the seat portion 71a and the disc 75a. The fixed orifice 78a communicates the passages 60a with the lower chamber 13 even when the seat portion 71a is in contact with the disc 75a. The fixed orifice 78a is formed by a groove formed in the seat portion 71a or an opening formed in the disc 75a. The disc 75a opens the passages 60a by moving far away from the seat portion 71a. The valve regulating member 77a regulates deformation of the disc 75a in excess of a defined level in an open direction. The damping valve 62a is installed at the passages 60a to suppress a flow of the hydraulic fluid generated by sliding movement of the piston 11, generating a damping force.

Similarly, the damping valve 62b includes the seat portion 71b, and an annular disc 75b that is capable of being simultaneously seated on the entire seat portion 71b. The damping valve 62b constitutes a disc valve. The disc 75b is also constituted by overlapping a plurality of annular single discs each other. An annular valve regulating member 77b having a smaller diameter than the disc 75b is disposed at one side of the disc 75b opposite to the piston main body 14. The valve regulating member 77b regulates deformation of the disc 75b in excess of a defined level in an open direction. The valve regulating member 77b is in contact with an axial end portion 80 of the main shaft portion 21 of the piston rod 16 adjacent to the attachment shaft portion 20.

A fixed orifice 78b is formed in the damping valve 62b between the seat portion 71b and the disc 75b. The fixed orifice 78b communicates the passages 60b with the upper chamber 12 even when the seat portion 71b is in contact with the disc 75b. The fixed orifice 78b is formed by a groove formed in the seat portion 71b or an opening formed in the disc 75b. The disc 75b open the passages 60b by moving far away from the seat portion 71b. The valve regulating member 77b regulates deformation of the disc 75b in excess of a defined level in an open direction. The damping valve 62b is installed at the passages 60b to suppress a flow of the hydraulic fluid generated by sliding movement of the piston 11, generating a damping force.

While the first embodiment exemplifies the damping valves 62a and 62b, which are disc valves of inner circumferential clamps, the damping valve is not limited thereto but may be any mechanism generating a damping force. For example, the damping valve may be a lift-type valve biasing a disc valve using a coil spring or may be a poppet valve.

A damping force varying mechanism 65, which is a frequency response part configured to vary a damping force, not controlled from the exterior by a frequency (a vibration state), is threadedly engaged with a male thread 19 of a front end of the piston rod 16. The damping force varying mechanism 65 includes a cover member 82, a housing 85, a free piston 87, an O-ring 88, and an O-ring 89. A female thread 81 threadedly engaged with the male thread 19 of the piston rod 16 is formed at the cover member 82. The housing 85 includes a housing main body 83 having a substantially cylindrical shape attached to the cover member 82 so that an opening side of one end is closed. The free piston 87 is slidably inserted into the housing 85. The O-ring 88 is interposed between the free piston 87 and the cover member 82 of the housing 85. The O-ring 88 is an elastic body of the compression side compressively deformed when the free piston 87 moves toward the cover member 82 in the axial direction with respect to the housing 85. The O-ring 89 is interposed between the free piston 87 and the housing main body 83 of the housing 85. The O-ring 89 is an elastic body of the extension side compressively deformed when the free piston 87 moves toward an opposite side of the above direction with respect to the housing 85. In addition, in FIG. 2, for the sake of convenience, the O-rings 88 and 89 in a natural state are shown. In particular, since the O-ring 89 functions as a seal, the O-ring 89 may be disposed such that it is always deformed (a non-circular cross-section) in an attached state. The O-ring 88 is a resistance element, which is compressively deformed when the free piston 87 moves in one direction, configured to generate a resistance with respect to displacement of the free piston 87. The O-ring 89 is a resistance element, which is compressively deformed when the free piston 87 moves in the other direction, configured to generate a resistance with respect to displacement of the free piston 87.

The cover member 82 is mainly formed by a cutting process. The cover member 82 includes a cover inner tube portion 91 having a substantially cylindrical shape, a cover base plate portion 92 having a disc shape and radially extending outward from an end of the cover inner tube portion 91 in the axial direction, a cover outer tube portion 93 extending from the outer circumference side of the cover base plate portion 92 in the same direction as the cover inner tube portion 91, and a cover front plate portion 95 configured to cover a front end side of the cover inner tube portion 91 and having an orifice 94.

The female thread 81 is formed at the inner circumference of the cover inner tube portion 91. The inner circumference of the cover outer tube portion 93 has a cylindrical surface portion 96 and a curved surface portion 97 in sequence from the cover base plate portion 92 side. The cylindrical surface portion 96 has a constant diameter. The curved surface portion 97 connected to the cylindrical surface portion 96 becomes an annular shape having a large diameter as it moves away from the cylindrical surface portion 96. The curved surface portion 97 has an arc-shaped cross-section including a central axis of the cover member 82. A male thread 98 is formed at the outer circumference of the cover outer tube portion 93.

The housing main body 83 is mainly formed by a cutting process. The housing main body 83 has a substantially cylindrical shape in which an inner annular protrusion 100 projecting inward in the radial direction is formed at one side thereof in the axial direction. A small diameter cylindrical surface portion 101, a curved surface portion 102, a large diameter cylindrical surface portion 103 and a female thread 104 are formed at the inner circumference of the housing main body 83 in sequence from one side in the axial direction. The small diameter cylindrical surface portion 101 has a constant diameter. The curved surface portion 102 connected to the small diameter cylindrical surface portion 101 becomes an annular shape having a large diameter as it moves away from the small diameter cylindrical surface portion 101. The large diameter cylindrical surface portion 103 connected to the curved surface portion 102 has a constant diameter that is larger than that of the small diameter cylindrical surface portion 101. The curved surface portion 102 has an arc-shaped cross-section including a central axis of the housing main body 83. The small diameter cylindrical surface portion 101 and the curved surface portion 102 are formed at the inner annular protrusion 100. In addition, while the housing main body 83 having a cylindrical shape has been described, the inner circumference may have a circular cross-section and the outer circumference may have a non-circular cross-section such as a polygonal shape.

As the male thread 98 of the cover member 82 is threadedly engaged with the female thread 104 of the housing main body 83, they are integrated to form the housing 85. The cover outer tube portion 93 of the cover member 82 configures an inner annular protrusion projecting inward in the radial direction more than the large diameter cylindrical surface portion 103 in the housing 85. The curved surface portion 97 is disposed in this portion to oppose the curved surface portion 102 of the inner annular protrusion 100 of the housing main body 83 in the axial direction.

The free piston 87 is generally formed by a cutting process. The free piston 87 includes a piston tube portion 108 having a substantially cylindrical shape, and a piston closing plate portion 109 configured to close an end side in the axial direction of the piston tube portion 108. An outer annular protrusion 110 projecting outward in the radial direction is formed at a center portion in the axial direction of the piston tube portion 108.

A small diameter cylindrical surface portion 113, a curved surface portion 114, a large diameter cylindrical surface portion 115, a curved surface portion 116 and a small diameter cylindrical surface portion 117 are formed at the outer circumference of the piston tube portion 108 in sequence from the piston closing plate portion 109 side in the axial direction. The curved surface portion 114, the large diameter cylindrical surface portion 115 and the curved surface portion 116 are formed at the outer annular protrusion 110.

The small diameter cylindrical surface portion 113 has a constant diameter. The curved surface portion 114 connected to the small diameter cylindrical surface portion 113 has an annular shape having a large diameter as it moves away from the small diameter cylindrical surface portion 113. The large diameter cylindrical surface portion 115 connected to the curved surface portion 114 has a constant diameter that is larger than that of the small diameter cylindrical surface portion 113. The curved surface portion 114 has an arc-shaped cross-section including a central axis of the free piston 87.

The curved surface portion 116 connected to the large diameter cylindrical surface portion 115 has an annular shape having a small diameter as it moves away from the large diameter cylindrical surface portion 115. The small diameter cylindrical surface portion 117 is connected to the curved surface portion 116. The small diameter cylindrical surface portion 117 has a constant diameter that is the same as the diameter of the small diameter cylindrical surface portion 113. The curved surface portion 116 has an arc-shaped cross-section including a central axis of the free piston 87. The outer annular protrusion 110 has a symmetrical shape with respect to a plane passing a central position in the axial direction thereof. The free piston 87 has a plurality of passage holes 118 formed at a central position in the axial direction of the outer annular protrusion 110 at predetermined intervals in the circumferential direction of the free piston 87. The passage holes 118 pass through the outer annular protrusion 110 in the radial direction.

The free piston 87 is slidably inserted into the large diameter cylindrical surface portion 103 of the housing main body 83 in the large diameter cylindrical surface portion 115 in a state in which the free piston 87 is disposed in the housing 85. In addition, in the free piston 87, the small diameter cylindrical surface portion 113 of one side is slidably inserted into the small diameter cylindrical surface portion 101 of the housing main body 83, and the small diameter cylindrical surface portion 117 of the other side is slidably inserted into the cylindrical surface portion 96 of the cover outer tube portion 93 of the cover member 82. While disposed in the housing 85, the curved surface portion 102 of the housing main body 83 and the curved surface portion 114 of the free piston 87 overlap in the radial direction thereof. Accordingly, the curved surface portion 102 of the housing main body 83 and the curved surface portion 114 of the free piston 87 face each other in a moving direction of the free piston 87. In addition, the curved surface portion 97 of the cover outer tube portion 93 of the cover member 82 and the curved surface portion 116 of the free piston 87 overlap in the radial direction thereof. Accordingly, the curved surface portion 97 of the cover member 82 and the curved surface portion 116 of the free piston 87 face each other in the moving direction of the free piston 87.

The O-ring 89 (in FIG. 2, shown in a natural state) is disposed between the small diameter cylindrical surface portion 113, the curved surface portion 114 of the free piston 87 and the curved surface portion 102, the large diameter cylindrical surface portion 103 of the housing main body 83. In other words, the O-ring 89 is disposed between the outer annular protrusion 110 of the free piston 87 and the inner annular protrusion 100 of one side of the housing 85. The O-ring 89 has a circular cross-section including a central axis when it is in a natural state. The O-ring 89 has an inner diameter smaller than that of the small diameter cylindrical surface portion 113 of the free piston 87, and an outer diameter larger than that of the large diameter cylindrical surface portion 103 of the housing main body 83. That is, the O-ring 89 is interference-fitted to both the free piston 87 and the housing 85 in the radial direction.

In addition, the O-ring 88 (in FIG. 2, shown in a natural state) is disposed between the large diameter cylindrical surface portion 103, the curved surface portion 97 of the housing 85 and the curved surface portion 116, the small diameter cylindrical surface portion 117 of the free piston 87. In other words, the O-ring 88 is disposed between the outer annular protrusion 110 of the free piston 87 and the cover outer tube portion 93, which is an inner annular protrusion of the other side of the housing. The O-ring 88 has a circular cross-section including a central axis when it is in a natural state. The O-ring 88 has an inner diameter smaller than that of the small diameter cylindrical surface portion 117 of the free piston 87, and an outer diameter larger than that of the large diameter cylindrical surface portion 103 of the housing 85. That is, the O-ring 88 is interference-fitted to both the free piston 87 and the housing 85 in the radial direction.

Both of the O-rings 88 and 89 have the same size. The O-rings 88 and 89 maintain the free piston 87 at a predetermined neutral position with respect to the housing 85, and allow movement in the axial direction of the free piston 87 toward both the upper chamber 12 side and the lower chamber 13 side in the axial direction with respect to the housing 85.

In the free piston 87, the O-ring 88 contacts the small diameter cylindrical surface portion 117 and the curved surface portion 116. Between the small diameter cylindrical surface portion 117 and the curved surface portion 116, the curved surface portion 116 is inclined in the moving direction of the free piston 87. In addition, in the housing 85, the O-ring 88 contacts the large diameter cylindrical surface portion 103 and the curved surface portion 97 of the housing 85. Between the large diameter cylindrical surface portion 103 and the curved surface portion 97, the curved surface portion 97 is inclined in the moving direction of the free piston 87.

In other words, the outer annular protrusion 110 is installed at the outer circumference portion of the free piston 87. Both surfaces in the axial direction of the outer annular protrusion 110 constitute the curved surface portion 114 and the curved surface portion 116. In the inner circumference of the housing 85, the inner annular protrusion 100 having the curved surface portion 102, and the cover outer tube portion 93 constituting the inner annular protrusion having the curved surface portion 97 are installed at both positions of the outer annular protrusion 110. The O-ring 89 and the O-ring 88 are installed between the outer annular protrusion 110, the inner annular protrusion 100 and the cover outer tube portion 93 constituting the inner annular protrusion, respectively.

In addition, a direction of a line segment connecting portions, which make the shortest distance, of the free piston contact surface in contact with the O-ring 89 in the small diameter cylindrical surface portion 113 and the curved surface portion 114 of the free piston 87, and the housing contact surface in contact with the O-ring 89 in the large diameter cylindrical surface portion 103 and the curved surface portion 102 of the housing 85 is varied. This is because the shortest distance at which portions of the free piston contact surface and the housing contact surface in contact with the O-ring 89 pass through the center of the O-ring is varied by movement of the free piston 87. In other words, the small diameter cylindrical surface portion 113 and the curved surface portion 114, and the large diameter cylindrical surface portion 103 and the curved surface portion 102 are configured such that the direction of the line segment of the shortest distance connecting the portions of the free piston contact surface of the free piston 87 and the housing contact surface of the housing 85 in contact with the O-ring 89 is varied. Specifically, when the free piston 87 is disposed at the upper chamber 12 side (the upper portion of FIG. 2) in the axial direction with respect to the housing 85, the shortest distance of the portions of the free piston contact surface and the housing contact surface in contact with the O-ring 89 is a difference in radius between the large diameter cylindrical surface portion 103 and the small diameter cylindrical surface portion 113 (since a difference in radius between the outer diameter and the inner diameter of the O-ring 89 is larger than that between the large diameter cylindrical surface portion 103 and the small diameter cylindrical surface portion 113, the O-ring 89 is deformed by the difference, and the line segment of the shortest distance has an inclination angle of 0). Meanwhile, when the free piston 87 moves toward the lower chamber 13 side (the lower side of FIG. 2) in the axial direction with respect to the housing 85, contact portions with the O-ring 89 become the curved surface portion 114 and the curved surface portion 102, and the most deformed portion of the O-ring 89, i.e., the line segment of the shortest distance, has a predetermined inclination angle.

Similarly, a direction of a line segment connecting portions, which make the shortest distance, of the free piston contact surface in contact with the O-ring 88 in the small diameter cylindrical surface portion 117 and the curved surface portion 116 of the free piston 87, and the housing contact surface in contact with the O-ring 88 in the large diameter cylindrical surface portion 103 and the curved surface portion 97 of the housing 85 is varied. This is because the shortest distance of the portions in contact with the O-ring 88 is varied by movement of the free piston 87. In other words, the small diameter cylindrical surface portion 117 and the curved surface portion 116, and the large diameter cylindrical surface portion 103 and the curved surface portion 97 are configured such that the direction of the line segment of the shortest distance connecting the portions of the free piston contact surface of the free piston 87 and the housing contact surface of the housing 85 in contact with the O-ring 88 is varied. Specifically, when the free piston 87 is disposed at the lower chamber 13 side (the lower side of FIG. 2) in the axial direction with respect to the housing 85, the shortest distance between the portions of the free piston contact surface and the housing contact surface in contact with the O-ring 88 is a difference in radius between the large diameter cylindrical surface portion 103 and the small diameter cylindrical surface portion 117 (since a difference in radius between the outer diameter and the inner diameter of the O-ring 88 is larger than that between the large diameter cylindrical surface portion 103 and the small diameter cylindrical surface portion 117, the O-ring 88 is deformed by the difference, and the line segment of the shortest distance has an inclination angle of 0). Meanwhile, when the free piston 87 moves toward the upper chamber 12 side (the upper side of FIG. 2) in the axial direction with respect to the housing 85, contact portions with the O-ring 88 become the curved surface portion 97 and the curved surface portion 116, and the most deformed portion of the O-ring 88, i.e., the line segment of the shortest distance, has a predetermined inclination angle.

In addition, for example, the damping force varying mechanism 65 is assembled as follows. That is, the O-ring 89 is inserted into the housing main body 83 to a position of the curved surface portion 102. The free piston 87 is fitted inside the housing main body 83 and the O-ring 89. The O-ring 88 is inserted between the housing main body 83 and the free piston 87 to a position of the curved surface portion 116. Further, the cover member 82 is threadedly engaged with the housing main body 83. Then, the damping force varying mechanism 65 previously assembled as described above is attached by threadedly engaging the female thread 81 with the male thread 19 of the attachment shaft portion 20 of the piston rod 16. At this time, the cover base plate portion 92 of the housing 85 contacts the valve regulating member 77a. The outer diameter of the damping force varying mechanism 65, i.e., the outer diameter of the housing 85, is set to be smaller such that there is no influence on a flow channel resistance, in comparison with the inner diameter of the cylinder 10.

The piston rod 16 includes the spring mount 24, a passage hole 120, and a passage hole 121. The spring mount 24 contacts the retainer 23 of the main shaft portion 21. The passage hole 120 is formed along the radial direction at a position between the spring mount 24 and the intermediate stopper 28 spaced a predetermined distance away from the spring mount 24 by the auxiliary spring 26 in a set state. The passage hole 121 is opened at a front end in communication with the passage hole 120. The passage hole 121 has a larger diameter than the passage hole 120. The passage hole 121 is formed along the axial direction. The intermediate stopper 28 is configured to move over the piston rod 16 to approach or depart from the spring mount 24 while extending or compressing the auxiliary spring 26. As the intermediate stopper 28 approaches the spring mount 24, the passage hole 120 is closed to increase a closing amount according to an approach level toward the spring mount 24. When the intermediate stopper 28 is maximally moved toward the retainer 23, the intermediate stopper 28 contacts the spring mount 24 locked by the retainer 23 to be stopped with respect to the piston rod 16. In this state, the intermediate stopper 28 entirely closes the passage hole 120. As described above, the intermediate stopper 28 and the passage hole 120 configure a variable orifice 122 in which a passage area is adjusted. The upper chamber 12 is in communication with the pressure chamber 125 formed in the housing 85 of the damping force varying mechanism 65 by the passage holes 120 and 121 and the orifice 94 of the piston rod 16. In addition, the pressure chamber 125 is partitioned by the housing 85, the O-rings 88 and 89, and the free piston 87.

As described above, a plurality of passage holes 118 passing through the outer annular protrusion 110 in the radial direction are formed in the central position in the axial direction of the outer annular protrusion 110 of the free piston 87. Accordingly, the pressure chamber 125 is always in communication with the chamber 128 surrounded by the housing 85, the O-ring 88, the O-ring 89, and the free piston 87 via the passage holes 118. In other words, the passage holes 118 guide the hydraulic fluid from the pressure chamber 125 into the chamber 128 between the O-ring 88 and the O-ring 89. In addition, the passage holes 118 are formed at a position of the outer annular protrusion 110 of the free piston 87. For this reason, in the entire moving range of the free piston 87 with respect to the housing 85, the free piston 87 does not contact either of the O-ring 88 and the O-ring 89.

The passage holes 120 and 121, the orifice 94 and the pressure chamber 125 are in communication with the upper chamber 12 to constitute a passage (a second passage) 130. The passage 130 is a passage through which the hydraulic fluid flows from the upper chamber 12 in the cylinder 10 by movement of the piston 11 toward the upper chamber 12 side. Accordingly, the variable orifice 122 constituted by the intermediate stopper 28 and the passage hole 120 is installed at the passage 130. The variable orifice 122 is installed in series with the pressure chamber 125. The O-rings 88 and 89 installed between the free piston 87 and the housing 85 and disposed at both sides in the sliding direction of the free piston 87 generate a resistance with respect to displacement of the free piston 87. That is, the O-ring 88 generates an elastic force when the free piston 87 moves toward the upper chamber 12 side at one side with respect to the housing 85. The O-ring 89 generates an elastic force when the free piston 87 moves toward the lower chamber 13 side at the other side with respect to the housing 85.

Here, in the extension stroke in which the piston rod 16 moves toward the extension side, the hydraulic fluid flows from the upper chamber 12 to the lower chamber 13 via the passages 60a. Here, when the piston speed is within an ultra low speed range, the hydraulic fluid introduced into the passages 60a from the upper chamber 12 basically flows to the lower chamber 13 via the fixed orifice 78a, which is always kept open, formed between the seat portion 71a and the disc 75a in contact with the seat portion 71a, and at this time, a damping force of the orifice characteristics (the damping force is proportional to the square of the piston speed) occurs. In addition, when the piston speed is increased to arrive at a low speed range, the hydraulic fluid introduced into the passages 60a from the upper chamber 12 basically flows to the lower chamber 13 between the disc 75a and the seat portion 71a as the disc 75a is opened. For this reason, a damping force of the valve characteristics (the damping force is substantially proportional to the piston speed) occurs.

In the compression stroke in which the piston rod 16 moves toward the compression side, the hydraulic fluid flows into the upper chamber 12 from the lower chamber 13 via the passages 60b. Here, when the piston speed is within the ultra low speed range, the hydraulic fluid introduced into the passages 60b from the lower chamber 13 basically flows to the upper chamber 12 via the fixed orifice 78b, which is always kept open, formed between the seat portion 71b and the disc 75b in contact with the seat portion 71b, and at this time, a damping force of the orifice characteristics (the damping force is proportional to the square of the piston speed) occurs. In addition, when the piston speed is increased to arrive at a low speed range, the hydraulic fluid introduced into the passages 60b from the lower chamber 13 basically flows to the upper chamber 12 between the disc 75b and the seat portion 71b as the disc 75b is opened. For this reason, a damping force of the valve characteristics (the damping force is substantially proportional to the piston speed) occurs.

Here, a relatively high frequency range (for example, 7 Hz or more) when the piston speed is low, i.e., the ultra low speed range (for example, 0.05 m/s), corresponds to, for example, vibrations generated from fine concave and convex portions of a road surface, and in this circumstance, it is preferable to reduce the damping force. In addition, similarly, even when the piston speed is low, in contrast, a relatively low frequency range (for example, 2 Hz or less) corresponds to vibrations such as shaking caused by roll of the vehicle body, and in this circumstance, it is preferable to increase the damping force.

In response to the above, even when the piston speed is similarly low, the damping force varying mechanism 65 varies the damping force according to the frequency. That is, when the piston speed is low, as a frequency of reciprocation of the piston 11 becomes high, the pressure in the upper chamber 12 is increased in the extension stroke. In addition, while the hydraulic fluid is introduced from the upper chamber 12 into the pressure chamber 125 of the damping force varying mechanism 65 via the passage holes 120 and 121 and the orifice 94 of the piston rod 16, the free piston 87 resists a biasing force of the O-ring 89 disposed at the lower chamber 13 side in the axial direction and moves toward the lower chamber 13 side in the axial direction with respect to the housing 85. As the free piston 87 moves toward the lower chamber 13 in the axial direction, the hydraulic fluid is introduced into the pressure chamber 125 from the upper chamber 12. Accordingly, the flow rate of the hydraulic fluid introduced into the passages 60a from the upper chamber 12 and flowed into the lower chamber 13 via the damping valve 62a is reduced. According to the above configuration, the damping force is reduced. As described above, the free piston 87 varies the size and volume of the pressure chamber 125 by movement of the piston 11.

In the continued compression stroke, a pressure of the lower chamber 13 is increased. For this reason, while discharging the hydraulic fluid to the upper chamber 12 from the pressure chamber 125 via the orifice 94 and the passage holes 120 and 121 of the piston rod 16, the free piston 87 moved toward the lower chamber 13 side in the axial direction resists the biasing force of the O-ring 88 disposed at the upper chamber 12 side in the axial direction and moves toward the upper chamber 12 side in the axial direction with respect to the housing 85. As the free piston 87 moves toward the upper chamber 12 side in the axial direction, the volume of the lower chamber 13 is increased. In addition, a flow rate of the hydraulic fluid introduced into the passages 60b from the lower chamber 13 and flowed into the upper chamber 12 via the damping valve 62b is reduced. According to the above configuration, the damping force is reduced.

In addition, in the region in which the frequency of the piston 11 is high, the frequency of movement of the free piston 87 is also increased according thereto. As a result, at every extension stroke, the hydraulic fluid flows into the pressure chamber 125 from the upper chamber 12. Further, at every compression stroke, the volume of the lower chamber 13 is increased by a movement increment of the free piston 87, and the damping force is maintained in a reduced state.

On the other hand, when the piston speed is low, as the frequency of the piston 11 becomes low, the frequency of movement of the free piston 87 is also decreased according thereto. For this reason, while the hydraulic fluid flows to the pressure chamber 125 from the upper chamber 12 at the beginning of the extension stroke, thereafter, the free piston 87 compresses the O-ring 89 to be stopped at the lower chamber 13 side in the axial direction with respect to the housing 85, and the hydraulic fluid does not flow to the pressure chamber 125 from the upper chamber 12. For this reason, a flow rate of the hydraulic fluid introduced into the passages 60a from the upper chamber 12 and flowed into the lower chamber 13 via the damping valve 62a is not reduced, and the damping force is increased.

Even in the continued compression stroke, while the volume of the lower chamber 13 is increased by a movement increment of the free piston 87 with respect to the housing 85 at the beginning thereof, thereafter, the free piston 87 compresses the O-ring 88 to be stopped at the upper chamber 12 side in the axial direction with respect to the housing 85, and there is no influence on the volume of the lower chamber 13. For this reason, a flow rate of the hydraulic fluid introduced into the passages 60b from the lower chamber 13 and flowed into the upper chamber 12 via the damping valve 62b is not reduced, and the damping force is increased.

In addition, in this embodiment, as described above, the O-rings 88 and 89 formed of a rubber material are used as a component configured to provide an elastic supporting force to return the free piston 87 to a neutral position. In the neutral position of the free piston 87, the O-ring 88 disposed between the free piston 87 and the housing 85 is positioned between the large diameter cylindrical surface portion 103 of the housing main body 83 and the small diameter cylindrical surface portion 117 of the free piston 87. Further, the O-ring 89 is disposed between the large diameter cylindrical surface portion 103 of the housing main body 83 and the small diameter cylindrical surface portion 113 of the free piston 87.

When the free piston 87 moves from the neutral position toward the lower chamber 13 side in the axial direction with respect to the housing 85, for example, in the extension stroke, the large diameter cylindrical surface portion 103 of the housing 85 and the small diameter cylindrical surface portion 113 of the free piston 87 roll the O-ring 89 therebetween, i.e., rotate the O-ring 89 to move the inner diameter side and the outer diameter side in a reverse direction, so that the O-ring 89 moves toward the lower chamber 13 side in the axial direction with respect to the housing 85. After that, the upper chamber 12 side in the axial direction of the curved surface portion 102 of the housing 85 and the lower chamber 13 side in the axial direction of the curved surface portion 114 of the free piston 87 roll the O-ring 89 to compress the O-ring 89 in the axial direction and the radial direction of the free piston 87. Next, the lower chamber 13 side in the axial direction of the curved surface portion 102 of the housing 85 and the upper chamber 12 side in the axial direction of the curved surface portion 114 of the free piston 87 compress the O-ring 89 in the axial direction and the radial direction of the free piston 87. In addition, when the free piston 87 moves from the neutral position toward the lower chamber 13 side in the axial direction with respect to the housing 85 in the extension stroke, the large diameter cylindrical surface portion 103 of the housing 85 and the small diameter cylindrical surface portion 117 of the free piston 87 roll the O-ring 88 therebetween to move the O-ring 88 toward the lower chamber 13 side in the axial direction with respect to the housing 85.

At this time, a region in which the O-ring 89 is rolled between the large diameter cylindrical surface portion 103 of the housing 85 and the small diameter cylindrical surface portion 113 of the free piston 87 and a region in which the O-ring 89 is rolled between the curved surface portion 102 of the housing 85 and the curved surface portion 114 of the free piston 87 correspond to a rolling region in which the O-ring 89 is rolled at a position spaced apart from a downstream end in the moving region of the free piston 87. This rolling region is a moving region in which the O-ring 89 moves in the moving direction of the free piston 87 while contacting both the housing 85 and the free piston 87 at the position spaced apart from the downstream end. This movement is defined as movement of the downstream end position (a lower end position of FIG. 2) of the O-ring 89 in at least the moving direction of the free piston.

In addition, a compression region of the O-ring 89 between the curved surface portion 102 of the housing 85 and the curved surface portion 114 of the free piston 87 becomes a moving direction variation region in which the O-ring 89 is elastically deformed in the moving direction of the free piston 87 in the downstream end side of the moving region of the free piston 87. Elastic deformation in the moving direction variation region refers to deformation in which the upstream end position (an upper end position of FIG. 2) of the O-ring 89 in the moving direction of the free piston moves and the downstream end position does not move. Here, the rolling region and the moving region overlap a portion of the moving direction variation region.

In the continued compression stroke, when the free piston 87 moves toward the upper chamber 12 side in the axial direction with respect to the housing 85, the lower chamber 13 side in the axial direction of the curved surface portion 102 of the housing 85 and the upper chamber 12 side in the axial direction of the curved surface portion 114 of the free piston 87 release the compression of the O-ring 89. Next, the upper chamber 12 side in the axial direction of the curved surface portion 102 of the housing 85 and the lower chamber 13 side in the axial direction of the curved surface portion 114 of the free piston 87 roll the O-ring 89 to further release the compression thereof. Next, the large diameter cylindrical surface portion 103 of the housing 85 and the small diameter cylindrical surface portion 113 of the free piston 87 roll the O-ring 89 therebetween to move the O-ring 89 toward the upper chamber 12 side in the axial direction with respect to the housing 85. At this time, the large diameter cylindrical surface portion 103 of the housing 85 and the small diameter cylindrical surface portion 117 of the free piston 87 also roll the O-ring 88 to move the O-ring 88 toward the upper chamber 12 side in the axial direction with respect to the housing 85. Thereafter, the lower chamber 13 side in the axial direction of the curved surface portion 97 of the housing 85 and the upper chamber 12 side in the axial direction of the curved surface portion 116 of the free piston 87 roll the O-ring 88 to compress the O-ring 88 in the axial direction and the radial direction of the free piston 87. Next, the upper chamber 12 side in the axial direction of the curved surface portion 97 of the housing 85 and the lower chamber 13 side in the axial direction of the curved surface portion 116 of the free piston 87 compress the O-ring 88 in the axial direction and the radial direction of the free piston 87.

At this time, a region in which the O-ring 88 is rolled between the large diameter cylindrical surface portion 103 of the housing 85 and the small diameter cylindrical surface portion 117 of the free piston 87 and a region in which the O-ring 88 is rolled between the curved surface portion 97 of the housing 85 and the curved surface portion 116 of the free piston 87 correspond to a rolling region in which the O-ring 88 is rolled at a position spaced apart from the upstream end in the moving region of the free piston 87. The rolling region is a moving region in which the O-ring 88 moves in the moving direction of the free piston 87 while contacting both the housing 85 and the free piston 87 at the position spaced apart from the upstream end. This movement is defined as movement of the upstream end position (an upper end position of FIG. 2) of the O-ring 88 in at least the moving direction of the free piston.

In addition, a region in which the O-ring 88 is compressed between the curved surface portion 97 of the housing 85 and the curved surface portion 116 of the free piston 87 becomes a moving direction variation region in which the O-ring 88 is elastically deformed in the moving direction of the free piston 87 at the downstream end side in the moving region of the free piston 87. Elastic deformation in the moving direction variation region is deformation in which the downstream end position (a lower end position of FIG. 2) of the O-ring 88 in the moving direction of the free piston moves and the upstream end position does not move. Here, the rolling region and the moving region overlap a portion of the moving direction variation region.

In the continued extension stroke, the upper chamber 12 side of the curved surface portion 97 of the housing 85 and the lower chamber 13 side of the curved surface portion 116 of the free piston 87 release the compression of the O-ring 88. Next, the lower chamber 13 side of the curved surface portion 97 of the housing 85 and the upper chamber 12 side of the curved surface portion 116 of the free piston 87 roll the O-ring 88 to further release the compression of the O-ring 88. Next, the large diameter cylindrical surface portion 103 of the housing 85 and the small diameter cylindrical surface portion 117 of the free piston 87 roll the O-ring 88 therebetween to move the O-ring 88 toward the lower chamber 13 side in the axial direction with respect to the housing 85. At this time, the large diameter cylindrical surface portion 103 of the housing 85 and the small diameter cylindrical surface portion 113 of the free piston 87 also roll the O-ring 89 therebetween to move the O-ring 89 toward the lower chamber 13 side in the axial direction with respect to the housing 85. In addition, when the free piston 87 passes through the neutral position, the O-rings 88 and 89 are operated as described above.

According to the above-mentioned description, the O-rings 88 and 89 are deformed in the moving direction in the moving direction variation region.

Here, characteristics of a load with respect to the displacement of the free piston 87 by the O-rings 88 and 89 formed of a rubber material become non-linear characteristics. That is, the characteristics in a predetermined range before and after the neutral position of the free piston 87 become linear. When this range is exceeded, an increasing rate of a load is smoothly increased with respect to the displacement. As described above, since the amplitude of the piston 11 is also small in a region in which an operation frequency of the piston 11 is high, the displacement of the free piston 87 is reduced and the free piston 87 is operated within a linear characteristic range before and after the neutral position. Accordingly, the free piston 87 is easily moved and vibrated according to vibrations of the piston 11 to contribute to a reduction in damping force generated from the damping valves 62a and 62b.

On the other hand, in the region in which an operation frequency of the piston 11 is low, the amplitude of the piston 11 becomes larger. For this reason, the displacement of the free piston 87 is increased, and the free piston 87 is operated within a non-linear characteristic range. Accordingly, the free piston 87 cannot be slowly and smoothly moved, and the damping force generated by the damping valves 62a and 62b cannot be easily reduced.

Figure 3:
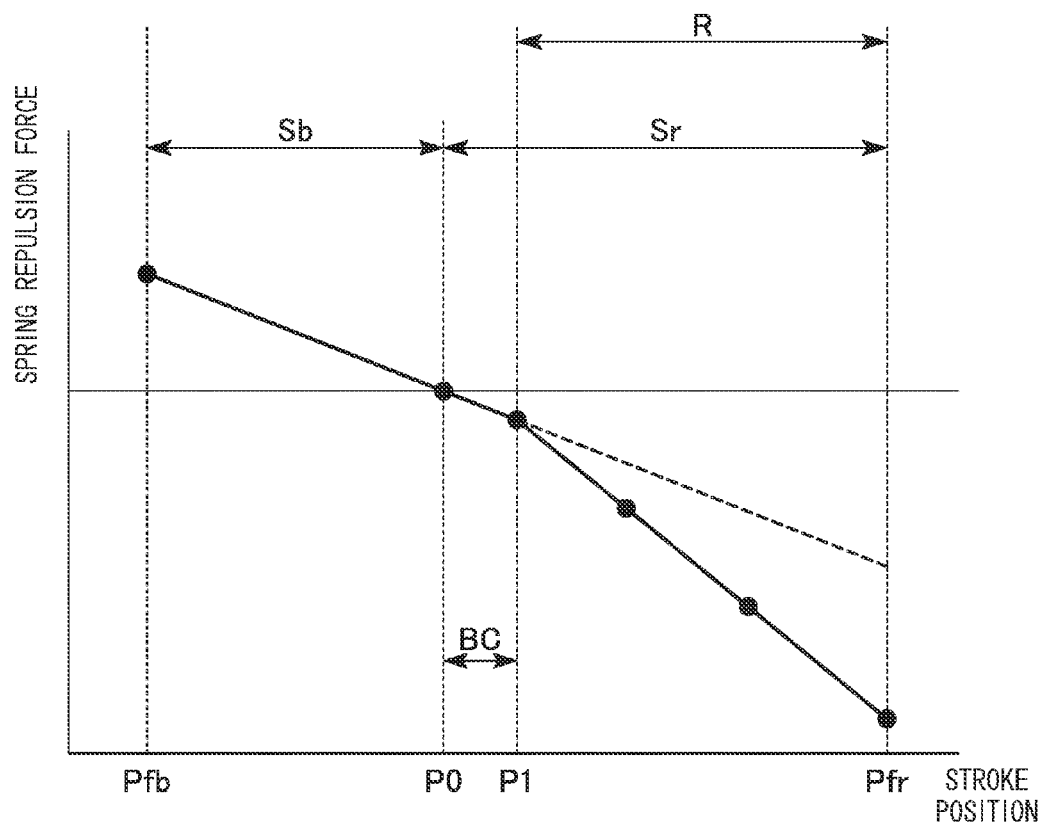
FIG. 3 is a graph showing the relationship between a stroke position and a spring reaction force in the shock absorber.

The rebound spring has an effect of suppressing a lift of the wheel of the inner circumference side when the vehicle is turned, and suppressing a roll amount of the vehicle body. FIG. 3 shows the relationship between spring reaction forces of a suspension spring, which is not shown, and a rebound spring with respect to the stroke position of the shock absorber having the rebound spring. FIG. 3 supposes that the suspension spring and the rebound spring are disposed between the spring mount 37 and the vehicle body. As shown in FIG. 3, the spring reaction force is highest at a full bottom position Pfb, which is a limit position of the compression side. A bound stroke Sb from the full bottom position Pfb to a 1G position (a position where the vehicle body is horizontal) P0, and a buffer clearance BC from the 1G position P0 to a predetermined position P1 of the extension side at which the rebound spring starts to act during the rebound stroke Sr of the compression side have a proportional relation based on a spring constant Ks of the suspension spring (not shown) interposed between the spring mount 37 and the vehicle body. In addition, in the rebound stroke Sr, a rebound spring operation range R from the predetermined position P1 of the extension side in which the rebound spring acts to a full rebound position Pfr, which is a limit position of the extension side, has a proportional relation by a spring constant Ks+Kr calculated by adding a spring constant Ks of the suspension spring and a spring constant Kr of the rebound spring, because the suspension spring and the rebound spring act in parallel. For this reason, in the rebound spring operation range R, while the roll amount of the vehicle body can be suppressed to be small, the spring constant is increased as the rebound spring acts. Accordingly, the damping force in the shock absorber is reduced. As a result, a vibration-damping property on the spring of the vehicle is insufficient, and ride comfort in the rebound spring operation range R during steering is degraded.

In contrast, in this embodiment, the opening to the upper chamber 12 of the passage hole 120 in the piston rod 16 is disposed between the spring mount 24 in contact with the retainer 23 and the intermediate stopper 28 spaced apart from the spring mount 24 by the auxiliary spring 26 in the set state. The passage hole 120 and the intermediate stopper 28 constitute the variable orifice 122 in which a passage area is varied. Accordingly, for example, when the piston rod 16 of the shock absorber included in suspension of an inside of the turn by roll of the vehicle body when the vehicle is turned moves toward the extension side, and further, in the extension stroke, the piston rod 16 moves toward the extension side by a predetermined distance to contact the shock absorbing body 31 with the rod guide 17 to enter the rebound spring operation range R, the spring mount 30 slides over the piston rod 16 to reduce the length of the rebound spring main body 29 between the intermediate stopper 28 and the spring mount 30 and reduce a length of the auxiliary spring 26 between the intermediate stopper 28, the spring mount 24 and the retainer 23. Accordingly, the intermediate stopper 28 is moved toward the spring mount 24 to close the passage hole 120.

At this time, the rebound spring main body 29 and the auxiliary spring 26 constituting the rebound spring 32 are simultaneously elastically deformed. For this reason, as the compression amount of the rebound spring main body 29 and the auxiliary spring 26 (a projection amount of the piston rod 16 from the cylinder 10) is increased, the opening of the passage hole 120 is reduced in size, and further, the intermediate stopper 28 is moved to entirely cover the passage hole 120 in the range from a predetermined position around the full rebound to the full rebound position. That is, when the piston rod 16 is moved in the extension direction, an opening area (a flow channel area) of the variable orifice 122 is adjusted by the rebound spring 32 constituted by the rebound spring main body 29 and the auxiliary spring 26. Specifically, when the piston rod 16 is moved in the extension direction, the opening area is adjusted to be reduced by the rebound spring 32.

Accordingly, when the piston rod 16 is elongated to the full rebound in the extension stroke, the hydraulic fluid flowing from the upper chamber 12 to the pressure chamber 125 of the damping force varying mechanism 65 via the passage holes 120 and 121 and the orifice 94, i.e., the passage 130, is limited in response to an elongation amount of the piston rod 16 from the cylinder 10 by the intermediate stopper 28. As a result, the hydraulic fluid flowing from the upper chamber 12 into the lower chamber 13 via the damping valve 62a is increased in response to an elongation amount of the piston rod 16 from the cylinder 10. Accordingly, a damping force of the shock absorber in the rebound spring operation range R is increased in response to the elongation amount of the piston rod 16 from the cylinder 10. In addition, when the piston rod 16 is elongated near the full rebound, the damping force varying mechanism 65 is in a non-operation state, and all of the hydraulic fluid flows from the upper chamber 12 to the lower chamber 13 via the damping valve 62a. That is, this becomes equivalent to a shock absorber with no frequency-response type damping force varying mechanism 65 which is capable of varying a damping force regardless of being controlled by the frequency from the outside.

In addition, for example, in the compression stroke in which the piston rod 16 moves from the full rebound toward the compression side, in contrast, at the beginning thereof, no hydraulic fluid flows from the pressure chamber 125 toward the upper chamber 12 side, and the free piston 87 does not move with respect to the housing 85. For this reason, there is no increase in volume of the lower chamber 13 caused by movement of the free piston 87, and all of the hydraulic fluid flows from the lower chamber 13 to the upper chamber 12 via the damping valve 62b to increase the damping force. After that, as extension amounts of the rebound spring main body 29 and the auxiliary spring 26 (an entry amount of the piston rod 16 into the cylinder 10) are increased, the opening of the passage hole 120 is increased in size, and further, the intermediate stopper 28 is moved to entirely open the passage hole 120 from before a predetermined distance where biasing forces of the rebound spring main body 29 and the auxiliary spring 26 do not act. Accordingly, the hydraulic fluid slowly flows from the pressure chamber 125 toward the upper chamber 12 side, an oil quantity of the hydraulic fluid flowing from the lower chamber 13 to the upper chamber 12 via the damping valve 62b is decreased, and the damping force is decreased.

Figure 4:
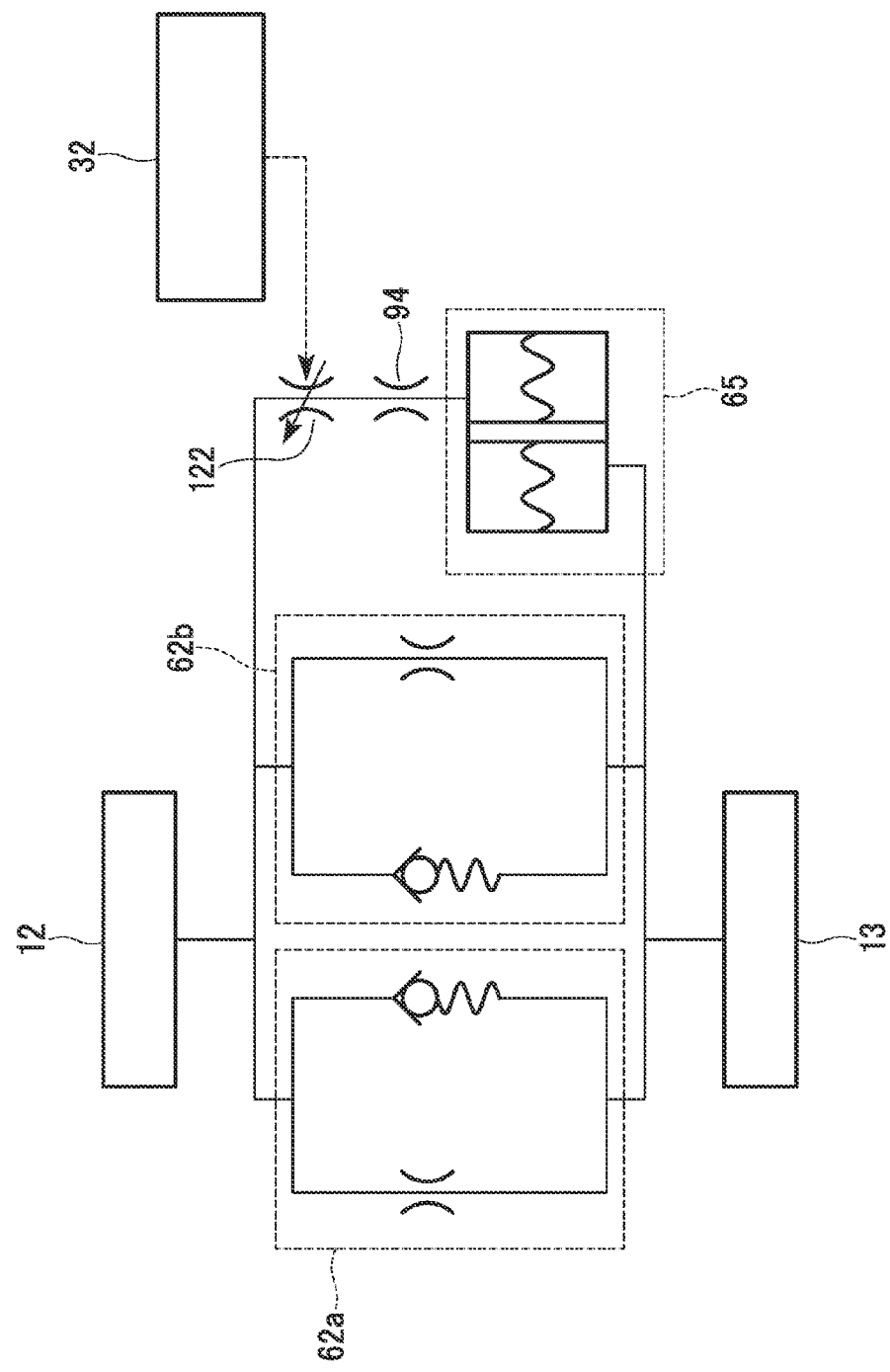
FIG. 4 is a hydraulic circuit diagram of the shock absorber in accordance with the first embodiment of the present invention.
Figure 5:
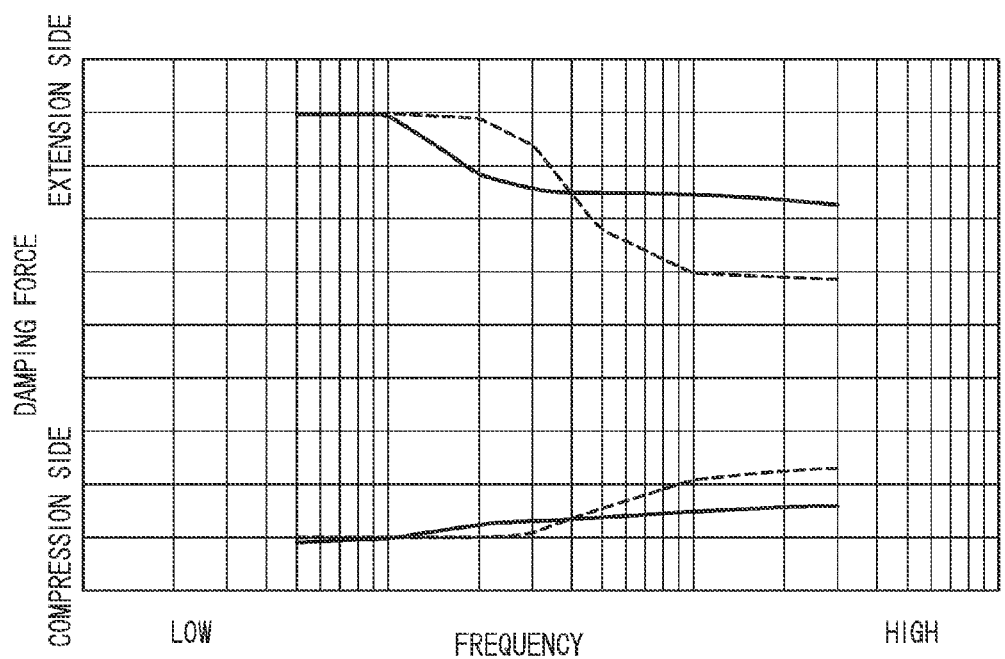
FIG. 5 is a graph showing the relationship between a frequency and a damping force of the shock absorber in accordance with the first embodiment of the present invention.

FIG. 4 shows a hydraulic circuit of the first embodiment having the above-mentioned configuration. That is, the damping valve 62a of the extension side, and the damping valve 62b and the damping force varying mechanism 65 of the compression side are installed in parallel between the upper chamber 12 and the lower chamber 13. In addition, the variable orifice 122 controlled by the rebound spring 32 is installed at the upper chamber 12 side of the damping force varying mechanism 65.

As described above, according to the first embodiment, a reduction in damping force can be suppressed by restricting an operation of the damping force varying mechanism 65 in the rebound spring operation range R. That is, in comparison with the case in which an operation of the damping force varying mechanism 65 is not limited as shown by dotted lines in FIG. 5, as the operation of the damping force varying mechanism 65 is limited, a reduction in damping force can be suppressed as shown by a solid line in FIG. 5. As a result, in the shock absorber at the inside of the turn during the roll of the vehicle body, a rising responsivity of the damping force after the full extension near the full rebound can be improved. As described above, the damping force characteristics can be more precisely controlled, and the steering stability and ride comfort of the vehicle equipped with the shock absorber can be improved.

Figure 6:
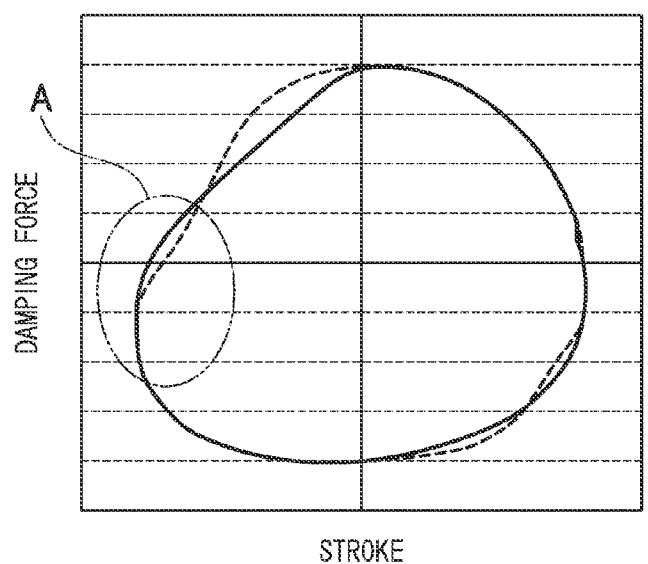
FIG. 6 is a graph showing the relationship between the stroke position and the damping force of the shock absorber in accordance with the first embodiment of the present invention.

That is, the damping force varying mechanism 65 may be set to increase a damping force decreasing rate with respect to high frequency input corresponding to a resonant frequency of a sprung mass in order to emphasize ride comfort on straight driving. However, when the damping force decreasing rate is increased and a frequency response function by the damping force varying mechanism 65 becomes too strong, conversely, the rising responsivity of the damping force is degraded with respect to low frequency input around the resonance of the sprung mass near a cutoff frequency where the ride comfort is softly switched, causing degradation of the vibration-damping property of the sprung mass. Accordingly, as described above, in the rebound spring operation range R, the variable orifice 122 is squeezed to weaken a frequency response function to obtain the following effects. That is, FIG. 6 shows a damping force Lissajous waveform at a resonant frequency of the sprung mass in a solid line. In addition, the case in which the frequency response function is not weakened is shown by dotted lines in FIG. 6. Therefore, as shown in a range A in FIG. 6, it will be appreciated that, as the rising responsivity of the damping force becomes better, the vibration-damping property of the sprung mass is improved.

Figure 7A:
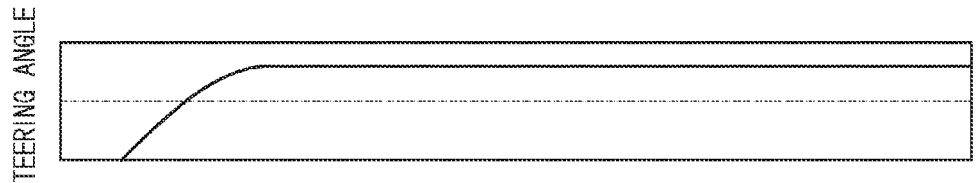
FIG. 7A is a graph showing simulation results when the shock absorber in accordance with the first embodiment of the present invention is used.
Figure 7B:
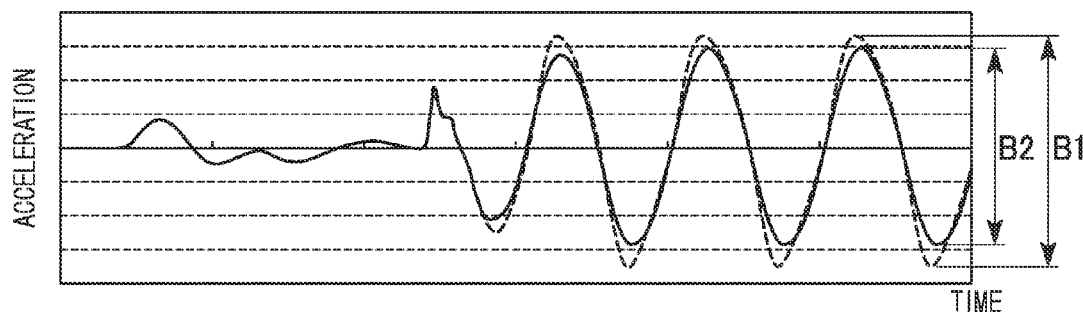
FIG. 7B is a graph showing simulation results when the shock absorber in accordance with the first embodiment of the present invention is used.
Figure 7C:
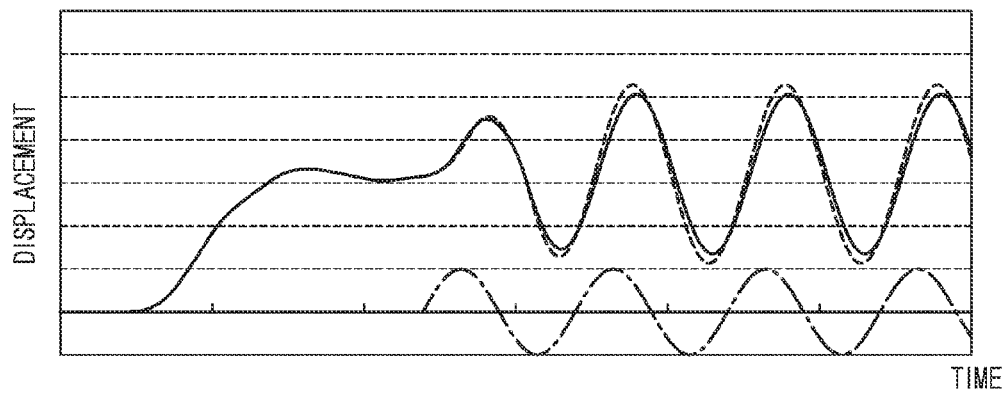
FIG. 7C is a graph showing simulation results when the shock absorber in accordance with the first embodiment of the present invention is used.

FIGS. 7A to 7C show simulation results for verifying the above-mentioned effects. FIG. 7A shows a steering angle of the vehicle equipped with the shock absorber. FIG. 7B shows upper and lower accelerations of the sprung mass of the inside of the turn. FIG. 7C shows upper and lower displacements of the sprung mass of the inside of the turn. As shown in FIG. 7A, this analysis is a simulation when a road surface input (±5 mm, 2 Hz) is input as shown in chain lines of FIG. 7C, during the turn as it is after the left turn (55 km/h, a steering angle of about 0.4 G) from the straight driving. In comparison with the case in which the operation of the damping force varying mechanism 65 is not limited as shown by dotted lines in FIG. 7B, as shown by a solid line in FIG. 7B, as the operation of the damping force varying mechanism 65 is limited, the upper and lower accelerations of the sprung mass of the inside of the turn are suppressed from a range B1 to a range B2. In addition, as for the upper and lower displacements of the sprung mass of the inside of the turn, in comparison with the case in which the operation of the damping force varying mechanism 65 is not limited as shown by a dotted line in FIG. 7C, as the operation of the damping force varying mechanism 65 is limited, the displacements are suppressed as shown by a solid line in FIG. 7C. Accordingly, it will be appreciated that the vibration-damping property of the sprung mass is improved. As a result, the ride comfort of the vehicle equipped with the shock absorber can be improved.

As a result, according to the embodiment, when the vehicle equipped with the shock absorber is straightly driven in a state in which the rebound spring 32 is not operated, the frequency response function can be sufficiently performed to improve the ride comfort. During the steering in which the rebound spring 32 is operated, as the damping force rising responsivity is increased to improve the vibration-damping property of the sprung mass with respect to a large input from the road surface or the steering, the handling stability can be improved. Further, degradation of the vibration-damping property of the sprung mass caused by an increase in spring constant can be prevented.

In the shock absorber disclosed in Japanese Unexamined Patent Application, First Publication No. 2006-177531, when the rebound spring is reduced in length, a plunger of the spring mount fixed to the piston rod is fitted into the spring mount of a movable side with respect to the piston rod to form an oil chamber between the piston rod and the plunger. The hydraulic fluid is flowed out of the oil chamber via an orifice formed in the plunger to generate a fluid force, thereby reducing impacts and noises upon the rebound.

In contrast, in the first embodiment, in the configuration in which the free piston 87 configured to vary the volume of the pressure chamber 125 by movement of the piston 11 is installed at the passage 130 in communication with the upper chamber 12 to vary the damping force in response to the frequency, the variable orifice 122 having an area varied by the rebound spring 32 is installed at the passage 130. In other words, the configuration in which the area of the variable orifice 122 is adjusted depending on a deflection amount of the rebound spring 32 is provided. Accordingly, strength of the frequency response function in which the damping force is reduced according to the input frequency can be adjusted in the operation range of the rebound spring 32 to vary the damping force characteristics. As a result, adjustment of the vibration-damping of the sprung mass upon operation of the rebound spring 32 can be performed. Therefore, the damping force characteristics can be more precisely controlled.

Specifically, the variable orifice 122 is adjusted such that its area is reduced by the rebound spring 32 when the piston rod 16 moves in the extension direction. For this reason, in the operation range of the rebound spring 32, as the piston rod 16 moves in the extension direction, entrance and exit of the hydraulic fluid with respect to the pressure chamber 125 is restricted to weaken the function of the frequency response, and a fluid amount flowing through the passages 60a and 60b having the damping valves 62a and 62b connecting the upper chamber 12 and the lower chamber 13 is increased. Accordingly, a reduction in damping force by operation of the rebound spring 32 can be suppressed. As a result, the rising responsivity of the damping force upon the steering can be improved, and the vibration-damping property of the sprung mass with respect to a low frequency input from the road surface is improved.

In addition, the variable orifice 122 is adjusted such that its area is reduced by the rebound spring 32 when the piston rod 16 moves in the extension direction. For this reason, as the biasing force of the rebound spring 32 is increased, the entrance and exit of the hydraulic fluid with respect to the pressure chamber 125 is restricted to weaken the function of frequency response. Accordingly, as the biasing force of the rebound spring 32 is increased, a large amount of hydraulic fluid can flow to the passages 60a and 60b at which the damping valves 62a and 62b are installed, thereby increasing the damping force.

Second Embodiment

Figure 8:
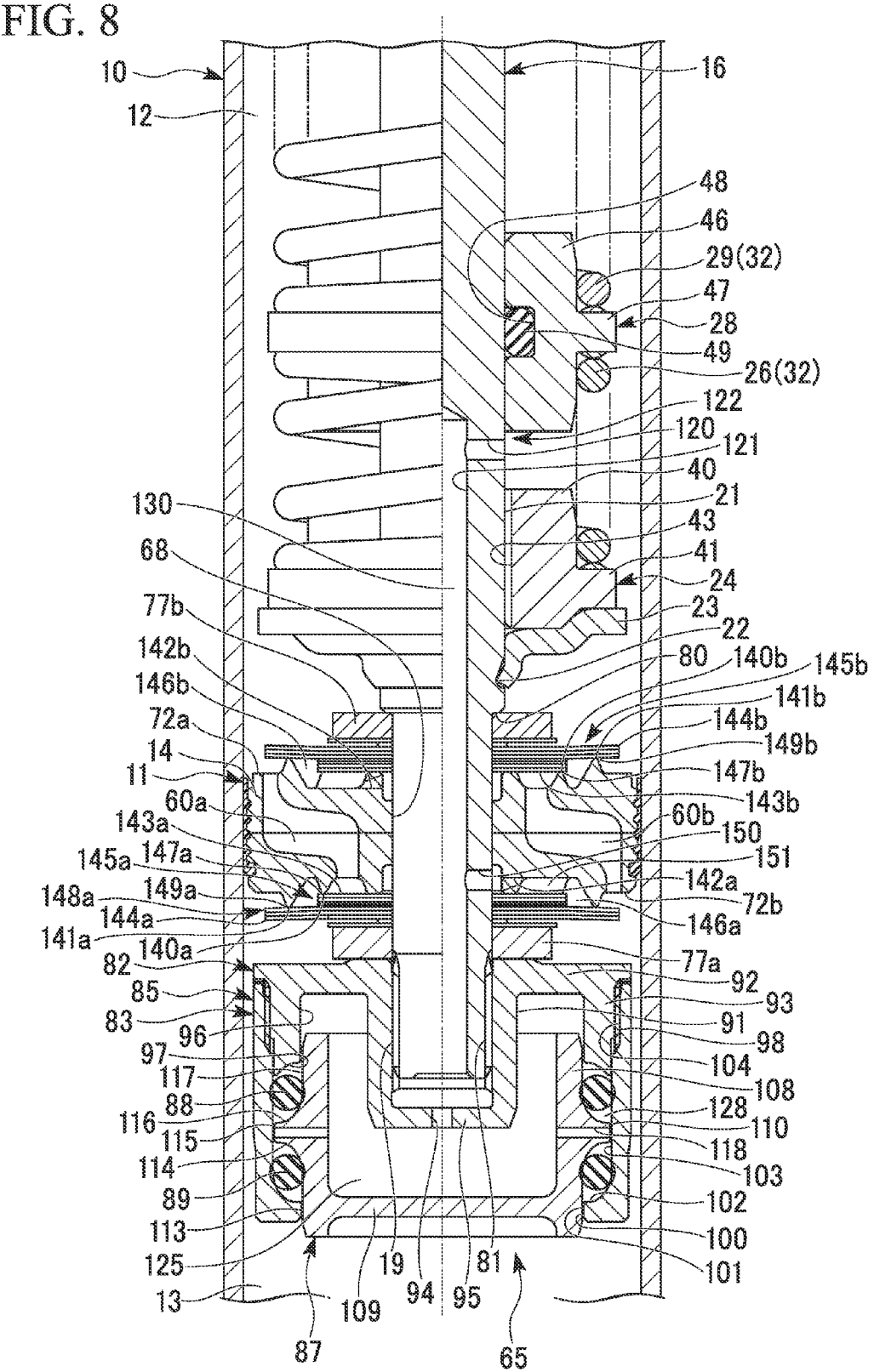
FIG. 8 is a cross-sectional view showing major parts of a shock absorber in accordance with a second embodiment of the present invention.

Hereinafter, a second embodiment will be described with reference to FIGS. 8 to 10 in regard to different matters than the first embodiment. In addition, like elements of the first embodiment are designated by like names and like reference numerals.

In the second embodiment, an annular inner seat portion 140a is formed at an end of the lower chamber 13 side of the piston main body 14 and outside one end opening position of the passage 60a of an extension side. An annular outer seat portion 141a having a height in an axial direction thereof larger than that of the inner seat portion 140a is formed outside in the radial direction of the inner seat portion 140a. Similar to the first embodiment, an annular step portion 72b having a height in the axial direction smaller than that of the seat portion 141a is formed at a portion of the outer seat portion 141a opposite to the insertion hole 68. The lower chamber 13 side of the passage 60b of a compression side is opened at a position of the step portion 72b. A passage groove 142a passing in the radial direction is formed in the inner seat portion 140a at a position not in communication with the passage 60a.

An annular inner seat portion 140b is formed at an end of the upper chamber 12 side of the piston main body 14 and outside one end opening position of the passage 60b of the compression side. An annular outer seat portion 141b having a height in the axial direction larger than that of the inner seat portion 140b is formed outside in the radial direction of the inner seat portion 140b. Similar to the first embodiment, an annular step portion 72a having a height in the axial direction smaller than that of the seat portion 141b is formed in a portion of the outer seat portion 141b opposite to the insertion hole 68. The upper chamber 12 side of the passage 60a of the extension side is opened at the position of the step portion 72a. A groove 142b passing in the radial direction is formed in the inner seat portion 140b at a position not in communication with the passage 60b.

An inner disc 143a in contact with the inner seat portion 140a and an outer disc 144a in contact with the outer seat portion 141a are installed between the piston main body 14 and the valve regulating member 77a. In addition, an inner disc 143b in contact with the inner seat portion 140b and an outer disc 144b in contact with the outer seat portion 141b are also installed between the piston main body 14 and the valve regulating member 77b.

The inner disc 143a and the inner seat portion 140a constitute a damping valve (a first damping valve) 145a of the extension side, which is a disc valve. A fixed orifice (a first fixed orifice) 147a is formed in the damping valve 145a between the inner disc 143a and the inner seat portion 140a. Even when the inner disc 143a and the inner seat portion 140a are in contact with each other, the fixed orifice 147a communicates the passage 60a with an intermediate chamber 146a outside the inner seat portion 140a. The fixed orifice 147a is formed by a groove formed in the seat portion 140a or an opening formed at the inner disc 143a.

A passage hole 150, which is an orifice configured to communicate the passage hole 121 with the passage groove 142a, is formed in the piston rod 16 along the radial direction. An intrapiston passage 151 constituted by the passage hole 150, the passage groove 142a and the intermediate chamber 146a is always in a communication state.

The outer disc 144a and the outer seat portion 141a constitute a damping valve (a second damping valve) 148a of the extension side, which is a disc valve. A fixed orifice (a second fixed orifice) 149a is formed in the damping valve 148a between the outer disc 144a and the outer seat portion 141a. Even when the outer disc 144a and the outer seat portion 141a are in contact with each other, the fixed orifice 149a communicates the intermediate chamber 146a with the lower chamber 13. The fixed orifice 149a is formed by a groove formed in the outer seat portion 141a or an opening formed in the outer disc 144a.

Accordingly, the intrapiston passage 151 can communicate the upper chamber 12 and the lower chamber 13 via a passage 130 having the passage hole 120 and the passage hole 121 and the damping valves 145a and 148a. The damping valve 145a, which is disposed inside, and the damping valve 148a, which is disposed outside, are disposed in series in the passage 151 to generate a damping force in the extension stroke. The intrapiston passage 151 communicates the intermediate chamber 146a between the inner damping valve 145a and the outer damping valve 148a with a downstream side of the variable orifice 122 via the passage hole 150 and the passage groove 142a.

An intermediate chamber 146b of the compression side is not in communication with the passage 130 formed of the passage hole 120 and the passage hole 121. Accordingly, in the compression side, a damping valve 145b of the compression side, which is a disc valve, is constituted by the inner disc 143b and the inner seat portion 140b, and the outer disc 144b and the outer seat portion 141b. A fixed orifice 147b is formed in the inner damping valve 145b between the inner disc 143b and the inner seat portion 140b. Even when the inner disc 143b and the inner seat portion 140b are in contact with each other, the fixed orifice 147b communicates the passage 60b with the intermediate chamber 146b outside the inner seat portion 140b. The fixed orifice 147b is formed by the groove formed in the seat portion 140a or the opening formed in the inner disc 143a. In addition, a fixed orifice 149b is also formed between the outer disc 144b and the outer seat portion 141b. Even when the outer disc 144b and the outer seat portion 141b are in contact with each other, the fixed orifice 149b communicates the intermediate chamber 146b with the upper chamber 12. The fixed orifice 149b is formed by a groove formed in the outer seat portion 141b or an opening formed in the outer disc 144b.

In the second embodiment having the above-mentioned configuration, except for the rebound spring operation range R, in the extension stroke in which the piston rod 16 moves toward the extension side, the hydraulic fluid of the upper chamber 12 flows to the lower chamber 13 through the outer damping valve 148a via the passage 130 and the intrapiston passage 151. In addition, the hydraulic fluid of the upper chamber 12 flows to the lower chamber 13 through the inner damping valve 145a and the outer damping valve 148a via the passage 60a. Further, the hydraulic fluid can be introduced into the pressure chamber 125 of the damping force varying mechanism 65 via the passage 130. Accordingly, a damping force is decreased.

In contrast, in the rebound spring operation range R, when the passage hole 120 of the variable orifice 122 is closed by the intermediate stopper 28, similar to the first embodiment, introduction of the hydraulic fluid from the upper chamber 12 into the damping force varying mechanism 65 via the passage 130 is restricted according to the closed amount. Accordingly, the damping force varying mechanism 65 is decreased in function. Moreover, the hydraulic fluid passing through the outer damping valve 148a from the upper chamber 12 via the passage 130 and the intrapiston passage 151 is restricted. For this reason, most of the hydraulic fluid flows from the upper chamber 12 to the lower chamber 13 through the inner damping valve 145a and outer damping valve 148a via the passage 60a to increase the damping force.

Figure 9:
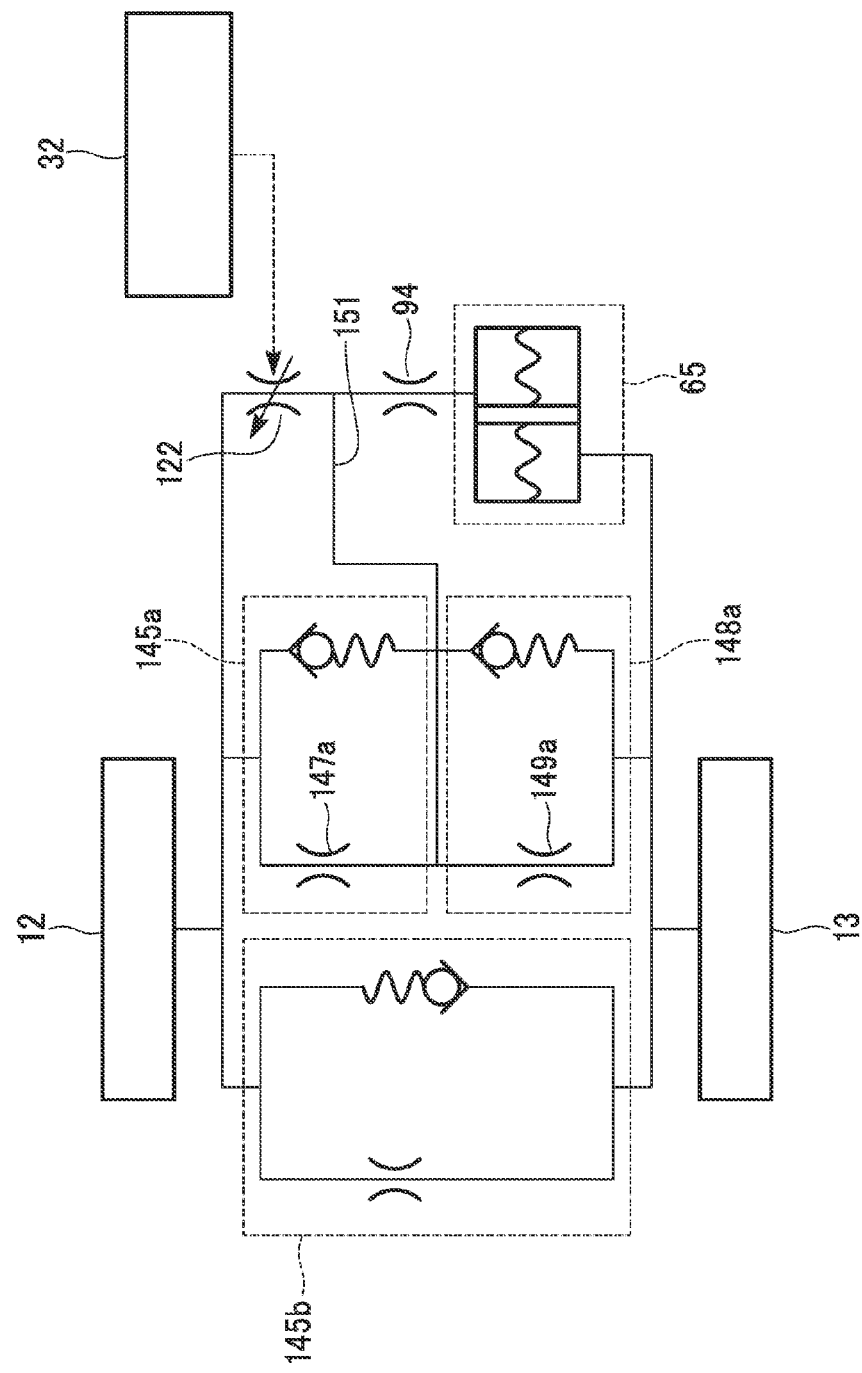
FIG. 9 is a hydraulic circuit diagram of the shock absorber in accordance with the second embodiment of the present invention.

FIG. 9 shows a hydraulic circuit diagram of the second embodiment having the above-mentioned configuration. In the hydraulic circuit diagram shown in FIG. 9, the inner damping valve 145a and the outer damping valve 148a are installed at the extension side in series. In addition, the downstream side of the variable orifice 122 between the inner damping valve 145a and the outer damping valve 148a is in communication with the valves via the intrapiston passage 151.

According to the second embodiment, the intermediate chamber 146a between the inner damping valve 145a and the outer damping valve 148a is in communication with the downstream side of the variable orifice 122. For this reason, similar to the first embodiment, in addition to restriction of the operation of the damping force varying mechanism 65 in the rebound spring operation range R, the flow channel of the outer damping valve 148a of one side of the extension side is restricted to further improve the damping force. Accordingly, the vibration-damping property of the sprung mass can be more effectively increased than in the first embodiment, and handling stability and ride comfort can be further improved.

Figure 10:
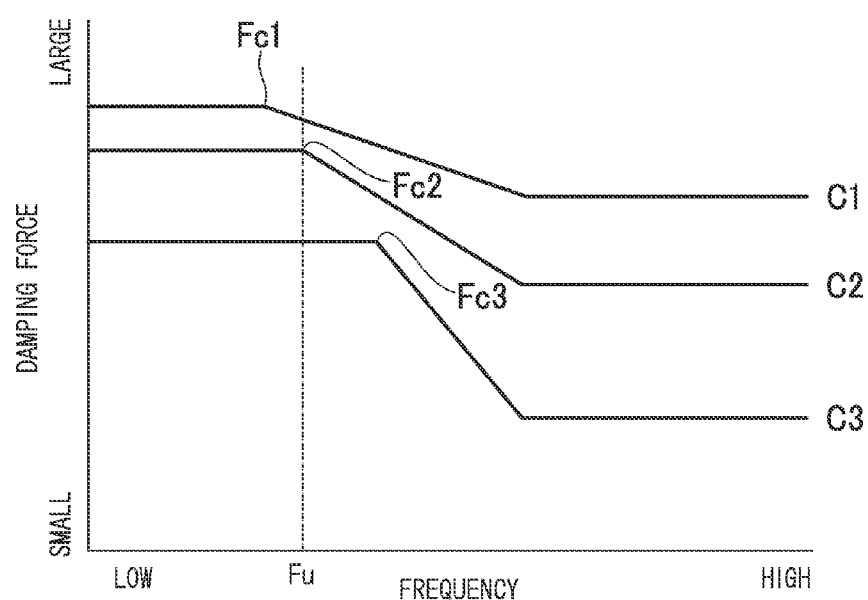
FIG. 10 is a graph showing the relationship between a frequency and a damping force of the shock absorber in accordance with the second embodiment of the present invention.

FIG. 10 shows characteristics of the damping force with respect to the frequency in the second embodiment for each flow channel area of the variable orifice 122. In FIG. 10, line C1 represents when the flow channel area is small, line C2 represents when the flow channel area is medium, and line C3 represents when the flow channel area is large. As shown in FIG. 10, cutoff frequencies Fc1, Fc2 and Fc3, at which the ride comfort is softly switched, can be varied according to the flow channel area of the variable orifice 122 to become a low frequency side as the flow channel area is reduced. In addition, in the damping force frequency characteristics of the extension side, as the variable orifice 122 is closed, the damping force can be increased even at a low frequency smaller than a resonant frequency Fu of the sprung mass, which is not varied in the damping force varying mechanism 65.

In addition, the inner damping valve 145a having the fixed orifice 147a and the outer damping valve 148a having the fixed orifice 149a are disposed in series to communicate a space between the damping valve 145a and the damping valve 148a with the downstream side of the variable orifice 122. Accordingly, an amount of the hydraulic fluid introduced between the inner damping valve 145a and the outer damping valve 148a, which are disposed in series, can be adjusted by the variable orifice 122, and thus, valve opening characteristics can be easily modified.

In the second embodiment, the damping valve 145a and the damping valve 148a formed of a dual sheet and having the inner seat portion 140a and outer seat portion 141a are used at the extension side. Accordingly, predetermined characteristics can be obtained with no increase in length of the piston 11 in the axial direction. In addition, although a length in the axial direction of the piston 11 are increased, a two-stage damping valve in which two damping valves are arranged in series may be provided.

Third Embodiment

Figure 11:
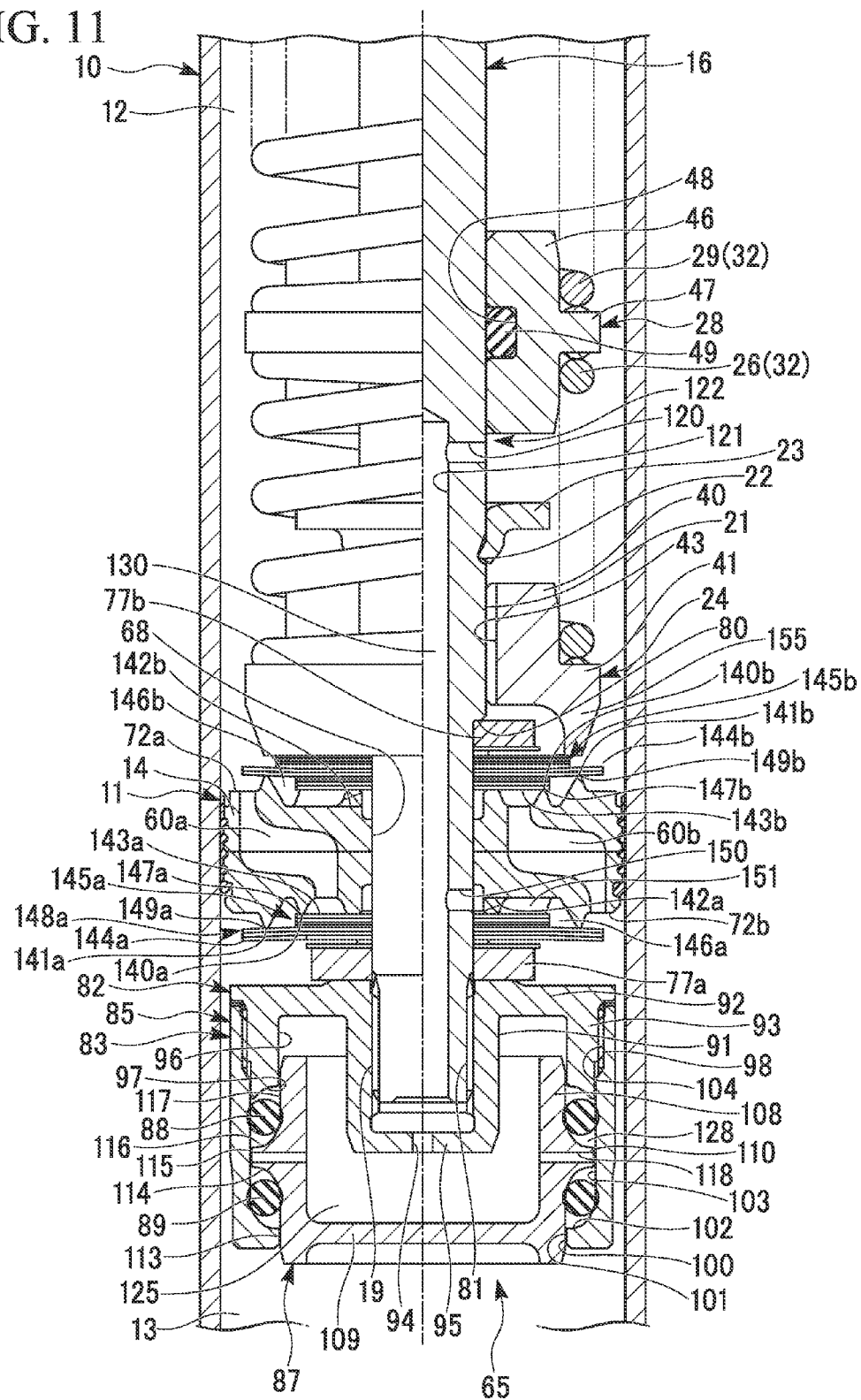
FIG. 11 is a cross-sectional view showing major parts of a shock absorber in accordance with a third embodiment of the present invention.

Hereinafter, a third embodiment will be described with reference to FIGS. 11 and 12 in regard to different matters than the second embodiment. In addition, like elements of the second embodiment are designated by like names and like reference numerals.

In the third embodiment, the spring mount 24 is installed between the retainer 23 and the piston 11, rather than between the retainer 23 and the intermediate stopper 28. In the third embodiment, the intermediate stopper 28 directly contacts the retainer 23. An annular valve pressing portion 155 projecting from the outer circumference of the flange portion 41 in the direction of the piston 11 is formed at the spring mount 24. The spring mount 24 contacts the outer disc 144b of the damping valve 145b of the compression side from an opposite side of the piston 11. The outer disc 144b presses the rebound spring 32, and so on, and opens the valve via the spring mount 24.

In the third embodiment having the above-mentioned configuration, in the compression stroke in which the piston rod 16 moves toward the compression side, when the damping valve 145b is opened, the outer disc 144b in contact with the valve pressing portion 155 of the spring mount 24 and the inner disc 143b therein should move with respect to the piston rod 16 by pressing the spring mount 24. Except for the rebound spring operation range R, the spring mount 24 basically does not receive the biasing force of the rebound spring 32. For this reason, the hydraulic fluid flowing to the upper chamber 12 from the lower chamber 13 via the passage 60b while opening the inner disc 143b and the outer disc 144b of the damping valve 145b can easily flow. Accordingly, the damping force is decreased.

In contrast, in the rebound spring operation range R, in the compression stroke in which the piston rod 16 moves toward the compression side, the rebound spring main body 29 and the auxiliary spring 26 constituting the rebound spring 32 are compressed. Accordingly, the biasing force thereof is applied to the outer disc 144b and the inner disc 143b therein from the valve pressing portion 155 of the spring mount 24. For this reason, the hydraulic fluid flowing to the upper chamber 12 from the lower chamber 13 via the passage 60b while opening the inner disc 143b and the outer disc 144b of the damping valve 145b cannot easily flow. Accordingly, the damping force is increased. Moreover, as the piston rod 16 is positioned at the full extension side, the biasing force to the outer disc 144b and the inner disc 143b of the damping valve 145b by the rebound spring main body 29 and the auxiliary spring 26 is increased. Accordingly, the damping force is increased.

Figure 12:
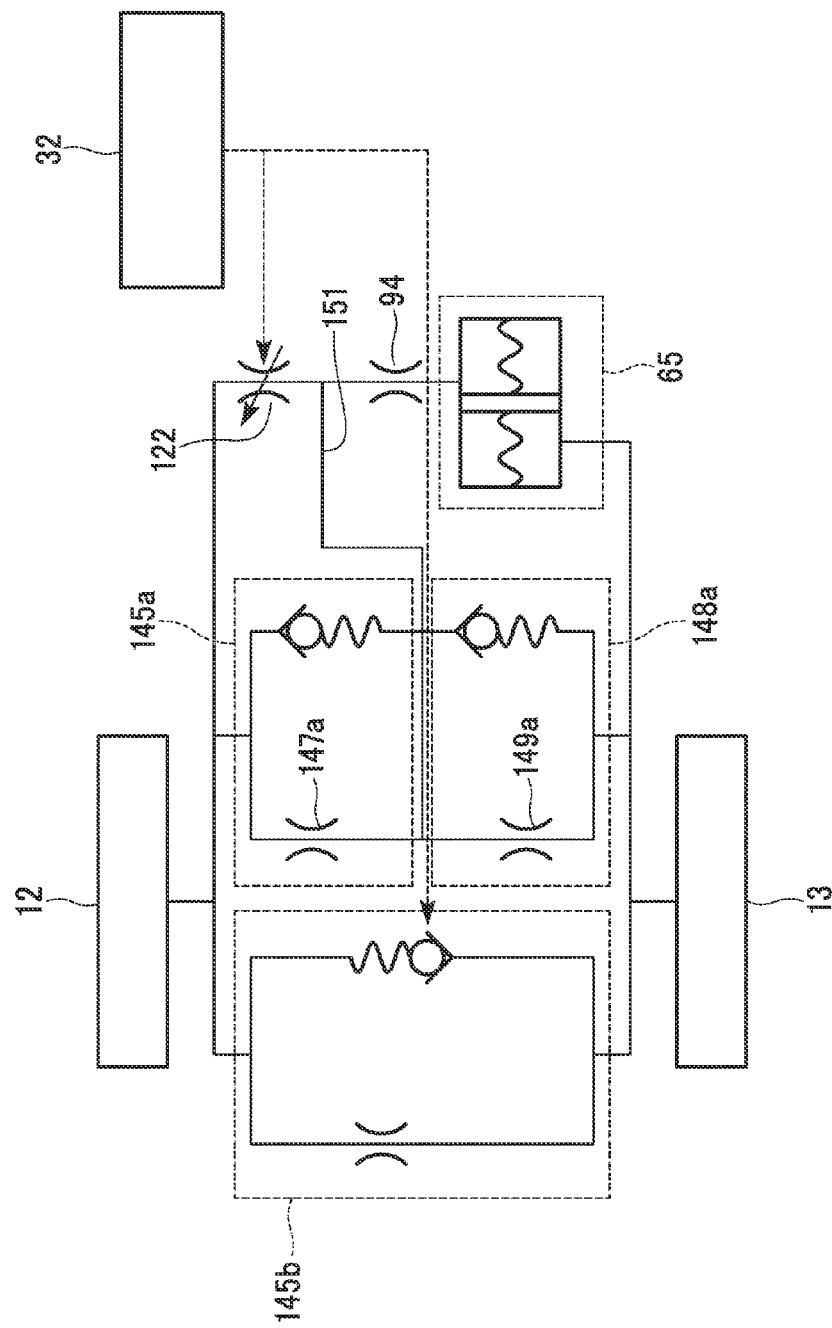
FIG. 12 is a hydraulic circuit diagram of the shock absorber in accordance with the third embodiment of the present invention.

FIG. 12 shows a hydraulic circuit diagram of the third embodiment having the above-mentioned configuration. As shown in FIG. 2, in the embodiment, the rebound spring 32 controls the damping valve 145b of the compression side, in addition to the variable orifice 122.

As described above, according to the third embodiment, in the rebound spring operation range R, similar to the second embodiment, the operation of the damping force varying mechanism 65 is restricted, and the flow channel from the upper chamber 12 to the damping valve 148a of the extension side is restricted, thereby increasing the damping force of the extension stroke. In addition, in this embodiment, in addition to the above-mentioned effects, the damping force of the damping valve 62b of the compression side can be increased. Accordingly, the vibration-damping property of the sprung mass can be more effectively increased than in the second embodiment, and handling stability and ride comfort can be further improved.

Fourth Embodiment

Figure 13:
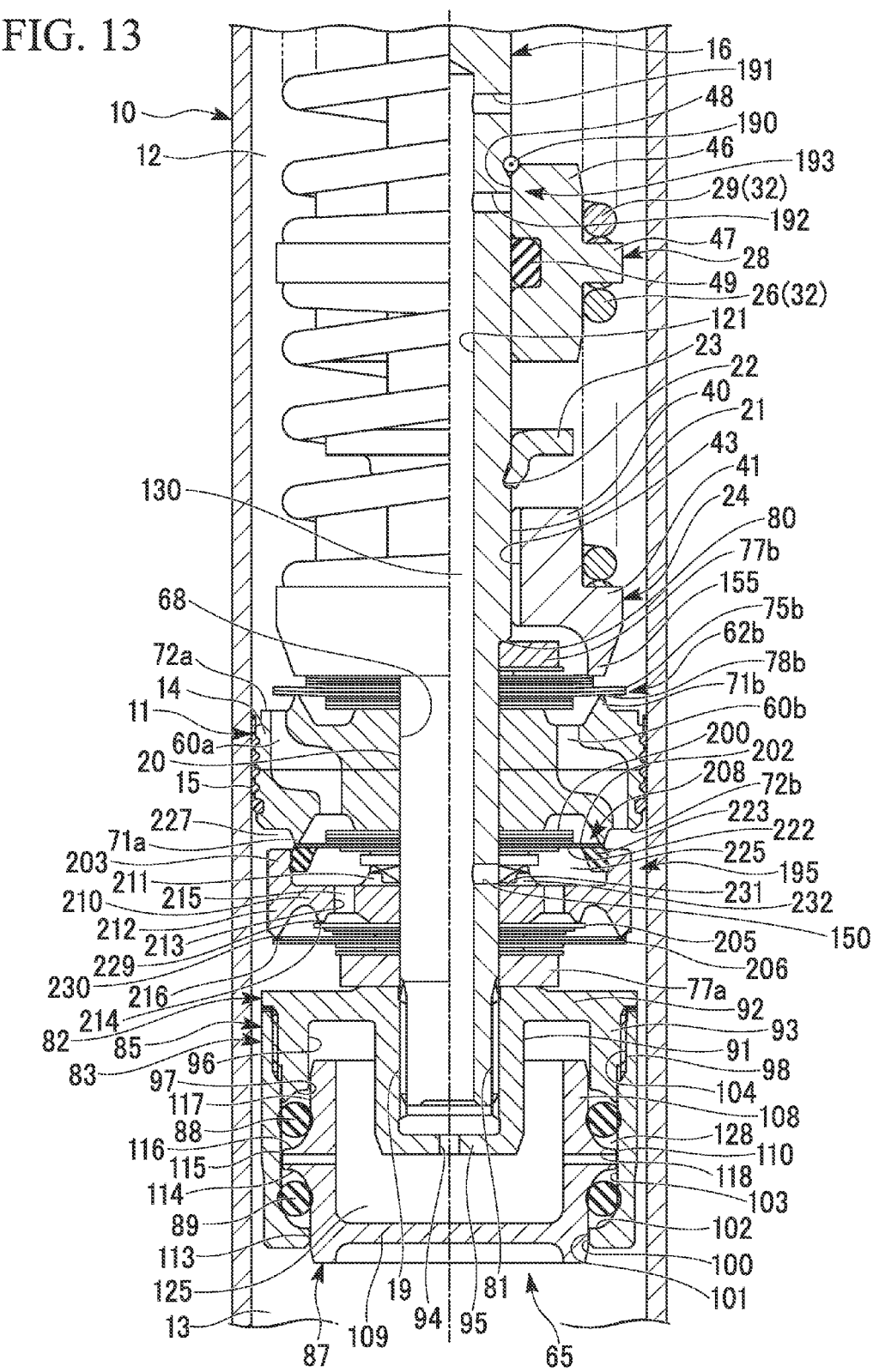
FIG. 13 is a cross-sectional view showing major parts of a shock absorber in accordance with a fourth embodiment of the present invention.

Hereinafter, a fourth embodiment will be described with reference to FIGS. 13 to 15 in regard to different matters than the first and third embodiments. In addition, like elements of the first and third embodiments are designated by like names and like reference numerals.

In the fourth embodiment, similar to the first embodiment, the damping valve 62b is provided at the compression side. In this embodiment, the valve pressing portion 155 of the spring mount 24 of the third embodiment contacts the disc 75b of the damping valve 62b.

In the fourth embodiment, a stopper ring 190 configured to regulate movement of the intermediate stopper 28 in a direction spaced apart from the retainer 23 is engaged with the piston rod 16. In addition, a passage hole 191 is formed in the piston rod 16 opposite to the retainer 23 of the stopper ring 190 along the radial direction of the piston rod 16 so that the passage hole 121 is always in communication with the upper chamber 12. In addition, a passage hole 192 is formed in the piston rod 16 opposite to the passage hole 191 of the stopper ring 190 along the radial direction of the piston rod 16 so that the passage hole 121 can communicate with the upper chamber 12. The passage hole 192 is closed by the intermediate stopper 28 when the intermediate stopper 28 is in contact with the stopper ring 190. Further, the passage hole 192 is opened when the intermediate stopper 28 moves toward the retainer 23.

The passage holes 191 and 192 constitute the passage 130 configured to communicate the upper chamber 12 and the pressure chamber 125 of the damping force varying mechanism 65. The intermediate stopper 28 and the passage holes 191 and 192 configure a variable orifice 193 installed at the passage 130. An area of the variable orifice 193 is adjusted by the rebound spring 32 when the piston rod 16 moves in the extension direction. The intermediate stopper 28 moves toward the retainer 23 to open the passage hole 192 when the piston rod 16 moves in the extension direction to compress the rebound spring 32. That is, the variable orifice 193 is adjusted to increase the area thereof by the rebound spring 32 when the piston rod 16 moves in the extension direction.

In addition, in the fourth embodiment, a damping force generating mechanism 195 is installed at the extension side. The damping force generating mechanism 195 of the fourth embodiment includes, in a sequence from the upper chamber 12 side in the axial direction, i.e., in a sequence from the piston main body 14 side, a small diameter disc 200, a damping valve main body 202 having a larger diameter than the small diameter disc 200, a valve member 203, a small diameter disc valve 205, a disc valve 206 having a larger diameter than the small diameter disc valve 205, and the valve regulating member 77a as described above. The disc valve 200 and the damping valve main body 202 configure a damping valve 208. The damping valve 208 is installed between the passage 60a of the piston main body 14 and a passage 215 of the valve member 203. The damping valve 208 regulates a flow of the hydraulic fluid generated by sliding of the piston 11 to generate the damping force. That is, the damping valve 208 is a disc valve. In addition, the damping valve 208 may be, for example, a poppet valve, in addition to the disc valve.

The valve member 203 includes a bottom portion 210 having a holed disc shape formed in a direction perpendicular to an axis, an inner cylindrical portion 211 having a cylindrical shape formed at an inner circumference side of the bottom portion 210 in an axial direction thereof, and an outer cylindrical portion 212 having a cylindrical shape formed at an outer circumference side of the bottom portion 210 in the axial direction. A plurality of through-holes 213 are formed to pass through the bottom portion 210 in the axial direction. An annular small diameter seat portion 214 projecting in the axial direction is formed outside the through-hole 213. A space between the inner cylindrical portion 211 and the outer cylindrical portion 212 of the valve member 203 including the plurality of through-holes 213 is in communication with the passage 60a of the piston main body 14 to communicate the upper chamber 12 and the lower chamber 13. This space constitutes a passage (a first passage) 215 through which the hydraulic fluid flows from the upper chamber 12 toward the lower chamber 13 by movement of the piston 11 toward the upper chamber 12 side. In addition, an annular large diameter seat portion 216 is formed at the outer cylindrical portion 212 adjacent to the lower chamber 13 side in the axial direction.

The damping valve main body 202 of the damping valve 208 regulates a flow of the hydraulic fluid generated by sliding of the piston 11 installed between the passage 60a of the piston main body 14 and the passage 215 of the valve member 203 to generate a damping force. The damping valve main body 202 is constituted by a disc 222 having a holed disc shape that can be seated on the seat portion 71*a* of the piston main body 14, and an annular seal member 223 formed of a rubber material and fixed to an outer circumference of the disc 222 opposite to the piston main body 14. The seal member 223 contacts the inner circumference of the outer cylindrical portion 212 of the valve member 203 to seal a gap between the damping valve main body 202 and the outer cylindrical portion 212 of the valve member 203. A space between the outer cylindrical portion 212, the bottom portion 210 and the inner cylindrical portion 211 of the valve member 203, and the damping valve main body 202 becomes a back pressure chamber 225 configured to apply an internal pressure to the damping valve main body 202 in a valve-closing direction to contact the seat portion 71*a*. In addition, when the damping valve main body 202 is spaced apart from the seat portion 71*a* of the piston main body 14 to be opened, the hydraulic fluid flows from the passage 60*a* to the lower chamber 13 via the flow channel 227 between the piston main body 14 and the valve member 203 in the radial direction.

The small diameter disc valve 205 has an annular shape that can be seated on the small diameter seat portion 214 of the valve member 203. The large diameter disc valve 206 has an annular shape that can be seated on the large diameter seat portion 216 of the valve member 203. When the disc valve 205 is spaced apart from the small diameter seat portion 214 and the disc valve 206 is spaced apart from the large diameter seat portion 216, the back pressure chamber 225 is opened. The valve regulating member 77*a* regulates deformation of the disc valve 206 in the opening direction in excess of a defined level. A discharge orifice 229, which is always kept open, is formed between the disc valve 205 and the small diameter seat portion 214 of the valve member 203. A discharge orifice 230, which is always kept open, is also formed between the disc valve 206 and the large diameter seat portion 216 of the valve member 203.

A passage groove 231 is formed to pass through the inner cylindrical portion 211 of the valve member 203 in the radial direction. The passage hole 150, which is an orifice of the piston rod 16, is in communication with the passage groove 231. The passage hole 150 and the passage groove 231 become a back pressure chamber inlet oil path 232 configured to introduce the hydraulic fluid into the back pressure chamber 225 from the upper chamber 12 in the cylinder 10.

In the fourth embodiment having the above-mentioned configuration, except for the rebound spring operation range R, in the extension stroke in which the piston rod 16 moves toward the extension side, when the piston speed is low, the hydraulic fluid flows from the upper chamber 12 to the lower chamber 13 via the passage 215 including the back pressure chamber inlet oil path 232 and the back pressure chamber 225, the discharge orifice (not shown), which is always kept open, formed between the small diameter seat portion 214 of the valve member 203 and the disc valve 205, and the discharge orifice (not shown), which is always kept open, formed between the large diameter seat portion 216 of the valve member 203 and the disc valve 206. Accordingly, a damping force of orifice characteristics (the damping force is in proportion to the square of the piston speed) occurs. For this reason, in the characteristics of the damping force with respect to the piston speed, an increasing rate of the damping force is relatively higher than an increase in piston speed. In addition, when the piston speed is high, the hydraulic fluid flows from the upper chamber 12 to the lower chamber 13 via the passage 215 including the back pressure chamber inlet oil path 232 and back pressure chamber 225, while opening the disc valves 205 and 206, through a space between the disc valve 205 and the small diameter seat portion 214 and a space between the disc valve 206 and the large diameter seat portion 216. Accordingly, a damping force of valve characteristics (the damping force is substantially proportional to the piston speed) occurs. For this reason, in the characteristics of the damping force with respect to the piston speed, an increasing rate of the damping force is slightly lowered with respect to an increase in piston speed.

In addition, when the piston speed arrives at a higher speed range, in a force (a oil pressure) applied to the damping valve 208, a force applied from the passage 60*a* in the opening direction is larger than a force applied from the back pressure chamber 225 in the closing direction through the back pressure chamber inlet oil path 232. Accordingly, in this range, the damping valve 208 is opened as the piston speed is increased. As a result, in addition to a flow from a space between the disc valve 205 and the small diameter seat portion 214 to the lower chamber 13 through a space between the disc valve 206 and the large diameter seat portion 216, since the hydraulic fluid flows to the lower chamber 13 via the flow channel 227 between the piston main body 14 and the valve member 203, an increase in damping force is suppressed. In characteristics of the damping force with respect to the piston speed at this time, an increasing rate of the damping force with respect to the increase in piston speed is almost none.

In addition, after an impact shock occurs, at the same frequency upon the occurrence, amplitude is reduced and the piston speed becomes low. In this range, in a force applied to the damping valve 208, a force applied in the opening direction from the passage 60*a* is smaller than a force applied in the closing direction from the back pressure chamber 225 through the back pressure chamber inlet oil path 232, and the damping valve 208 moves in the valve-closing direction. Accordingly, as the damping valve 208 is opened to reduce the flow from the upper chamber 12 to the lower chamber 13, since the flow from a space between the disc valve 205 and the small diameter seat portion 214 to the lower chamber 13 through a space between the disc valve 206 and the large diameter seat portion 216 becomes a main stream, an increasing rate of the damping force with respect to an increase in piston speed is increased. Accordingly, fluctuation of an unsprung mass after occurrence of the impact shock is suppressed.

In contrast to the above description, in the rebound spring operation range R, as the intermediate stopper 28 moves toward the retainer 23 to open the passage hole 192, the variable orifice 193 is added to the passage hole 191 to flow the hydraulic fluid to the passage 130 at an opening amount of the passage hole 192. Accordingly, a flow channel area of the passage 130 configured to communicate the upper chamber 12 with the pressure chamber 125 is increased to increase the function of frequency response by the damping force varying mechanism 65. In addition, in the compression stroke as in the third embodiment, the damping force is increased, and even in the extension stroke, the flow channel area of the passage 130 is increased. From this, in the force applied to the damping valve 208 of the damping force generating mechanism 195, a force applied in the closing direction from the back pressure chamber 225 via the back pressure chamber inlet oil path 232 is increased more than a force applied in the opening direction from the passage 60*a*. For this reason, the damping valve 208 is further pressed in the valve-closing direction to increase the damping force. That is, in the rebound spring operation range R, the function of frequency response is increased by the damping force varying mechanism 65, and the damping force in both directions of the extension side and the compression side is increased.

Figure 14:
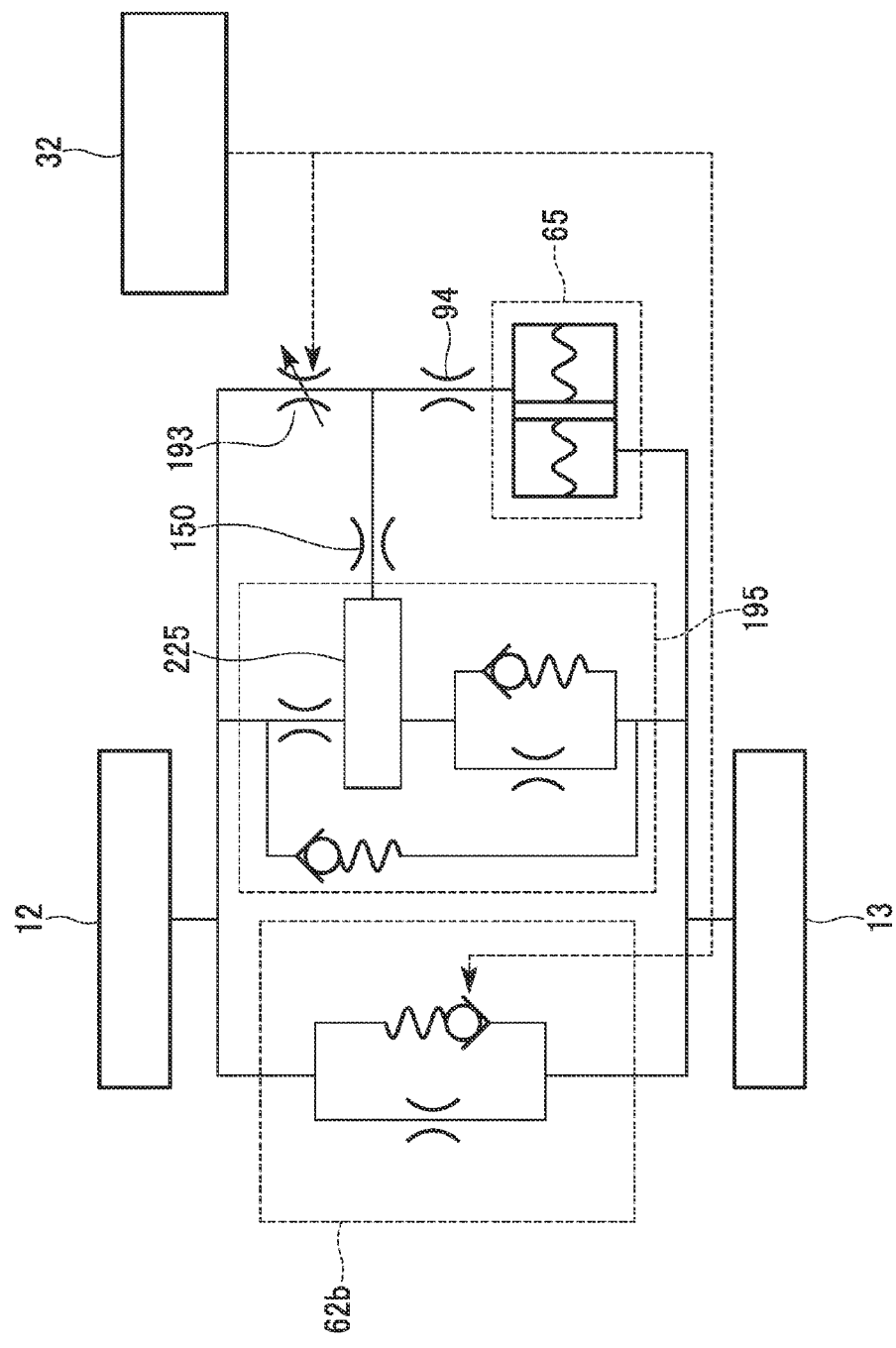
FIG. 14 is a hydraulic circuit diagram of the shock absorber in accordance with the fourth embodiment of the present invention.

FIG. 14 shows a hydraulic circuit diagram of the fourth embodiment having the above-mentioned configuration. As shown in FIG. 14, in this embodiment, the damping force generating mechanism 195 is installed at the extension side.

According to the above-mentioned fourth embodiment, the variable orifice 193 is configured to be adjusted such that the area is increased by the rebound spring 32 when the piston rod 16 moves in the extension direction. Accordingly, as the biasing force of the rebound spring 32 is increased, entrance and exit of the hydraulic fluid with respect to the pressure chamber 125 of the damping force varying mechanism 65 can be increased. As a result, in the rebound spring operation range R, a function of varying a damping force in response to a frequency can be improved. Accordingly, the function of frequency response by the damping force varying mechanism 65 of the rebound spring operation range R can be improved, and the damping force in both directions of the extension side and the compression side of the rebound spring operation range R can be increased.

Figure 15:
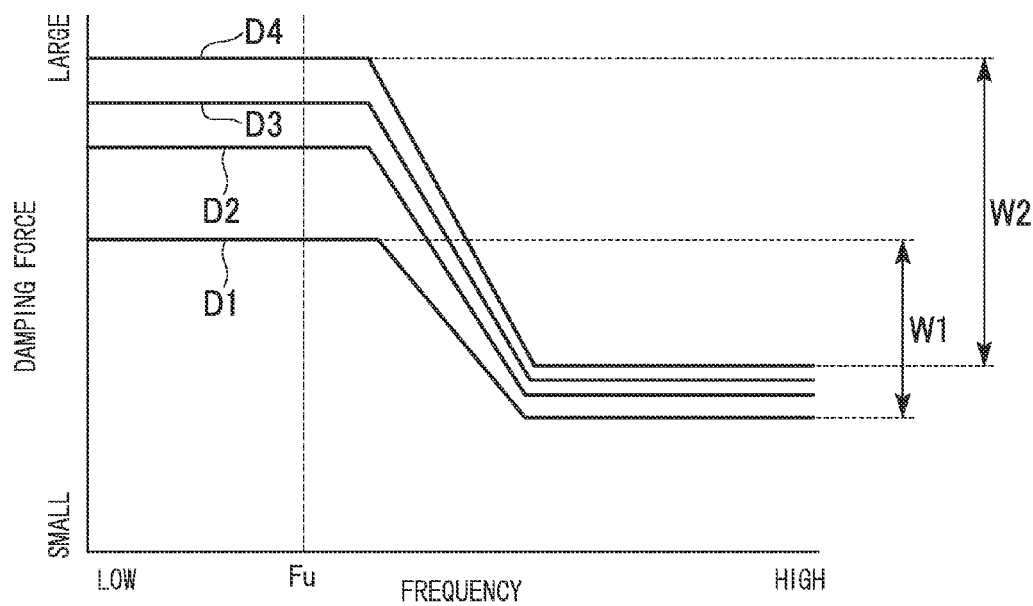
FIG. 15 is a graph showing the relationship between a frequency and a damping force of the shock absorber in accordance with the fourth embodiment of the present invention.

FIG. 15 shows characteristics of the damping force with respect to the frequency in the fourth embodiment for each flow channel area of the variable orifice 193. In FIG. 15, the flow channel area is increased in a sequence of line D1, line D2, line D3 and line D4. As shown in FIG. 15, in the damping force frequency characteristics of the extension side, as the flow channel area of the variable orifice 193 is increased in the rebound spring operation range R, the damping force in the low frequency range lower than the resonant frequency Fu of the sprung mass, which is not varied in the function of frequency response by the damping force varying mechanism 65, is increased similar to the third embodiment. Meanwhile, in the high frequency range, in contrast to the third embodiment, since the function of frequency response by the damping force varying mechanism 65 in the rebound spring operation range R is increased, the damping force is reduced. In addition, even in the characteristics of the compression side, while the damping force is increased at a low frequency, the increasing rate of the damping force in the rebound spring operation range R is decreased at a high frequency. In addition, in a variable width of the damping force, a variable width W2 at a maximum flow channel area is larger than a variable width W1 at a minimum flow channel area.

According to this function, during straight driving in which the rebound spring 32 is not operated, the function of frequency response can be increased by the damping force varying mechanism 65 to maintain ride comfort. Moreover, upon steering in which the rebound spring 32 is operated, the function of frequency response can be increased to improve the ride comfort while emphasizing a vibration-damping property and steering stability of the sprung mass with respect to a large input from the road surface or from steering.

Fifth Embodiment

Hereinafter, a fifth embodiment will be described with reference to FIG. 16 in regard to different matters than the first to fourth embodiments. In addition, like elements of the first to fourth embodiments are designated by like names and like reference numerals.

In the fifth embodiment, a damping force varying mechanism 250 different from the first to fourth embodiments is used. The damping force varying mechanism 250, like the damping force varying mechanism 65 of the first to fourth embodiments, is a frequency response part configured to vary the damping force, rather than controlled by a frequency (in a vibration state) from the outside. The damping force varying mechanism 250 may be replaced with the damping force varying mechanism 65 and applied to any of the first to fourth embodiments.

The damping force varying mechanism 250 includes a cover member 251, a housing 253, a free piston 255, a coil spring 256, a coil spring 257 and a seal ring 258. A female thread 249 threadedly engaged with the male thread 19 of the piston rod 16 is formed at the cover member 251. The housing 253 is constituted by a housing main body 252 having a substantially bottomed cylindrical shape and attached to the cover member 251 so that one end opening side thereof is closed. The free piston 255 is slidably inserted into the housing 253. The coil spring 256 is disposed between the free piston 255 and the cover member 251 of the housing 253. The coil spring 256 is an elastic body of the compression side, which is compressively deformed when the free piston 255 moves toward the cover member 251 side in the axial direction with respect to the housing 253. The coil spring 257 is disposed between the free piston 255 and the housing main body 252 of the housing 253. The coil spring 257 is an elastic body of the extension side, which is compressively deformed when the free piston 255 moves in an opposite direction of the above-mentioned direction with respect to the housing 253. The seal ring 258 is held in the free piston 255 to seal a gap between the housing 253 and the free piston 255. The coil spring 256 is compressively deformed when the free piston 255 moves in one direction to become a resistance element configured to generate a resistance with respect to the displacement of the free piston 255. The coil spring 257 is compressively deformed when the free piston 255 moves in the other direction to become a resistance element configured to generate a resistance with respect to the displacement of the free piston 255.

The cover member 251 is mainly formed by a cutting process. The cover member 251 includes a cover cylindrical portion 261 having a substantially cylindrical shape on which the female thread 249 is formed, and a cover flange portion 262 having a disc shape extending outward in the radial direction from an intermediate portion in the axial direction of the cover cylindrical portion 261.

The housing main body 252 is mainly formed by a cutting process. The housing main body 252 has a substantially bottomed cylindrical shape with a bottom portion 265 formed at one side in the axial direction of the cylindrical portion 264. A small diameter cylindrical surface portion 266, an intermediate cylindrical surface portion 267 having a larger diameter than the small diameter cylindrical surface portion 266, and a large diameter cylindrical surface portion 268 having a larger diameter than the intermediate cylindrical surface portion 267 are formed in the inner circumference of the cylindrical portion 264 of the housing main body 252 in a sequence from the bottom portion 265 side. An orifice 269 is formed to pass through the cylindrical portion 264 of the housing main body 252 at a position of the intermediate cylindrical surface portion 267 in the radial direction. In addition, an orifice 270 is also formed to pass through the bottom portion 265 in the axial direction.

The cover flange portion 262 of the cover member 251 is fitted to the large diameter cylindrical surface portion 268 of the housing main body 252. In this state, as an outer side is swaged rather than the cover member 251 of the housing main body 252, the housing main body 252 and the cover member 251 are integrated to constitute the housing 253.

The free piston 255 is mainly formed by a cutting process. The free piston 255 includes a piston tube portion 274 having substantially a cylindrical shape, and a piston bottom portion 275 configured to close an end side of the piston tube portion 274 in the axial direction. A seal groove 276 configured to hold the seal ring 258 is formed at the outer circumference of the piston tube portion 274 opposite to the piston bottom portion 275. An annular groove 277 having a ring shape and an axial direction groove 278 recessed at the piston bottom portion 275 from the annular groove 277 are formed in the outer circumference of the piston bottom portion 275 side.

The free piston 255, which is disposed in the housing 253, is slidably inserted into the intermediate cylindrical surface portion 257 of the housing main body 252. A coil spring 256 is disposed inside the piston tube portion 274 of the free piston 255 and between the piston bottom portion 275 and the cover flange portion 262. In the inside of the small diameter cylindrical surface portion 266 of the housing main body 252, the coil spring 257 is disposed between the bottom portion 265 of the housing main body 252 and the piston bottom portion 275. The free piston 255 is disposed at a predetermined neutral position in the housing 253 by the biasing force of the coil springs 256 and 257. At this time, the orifice 269 of the housing main body 252 is facing to the annular groove 277 of the free piston 255.

Figure 16:
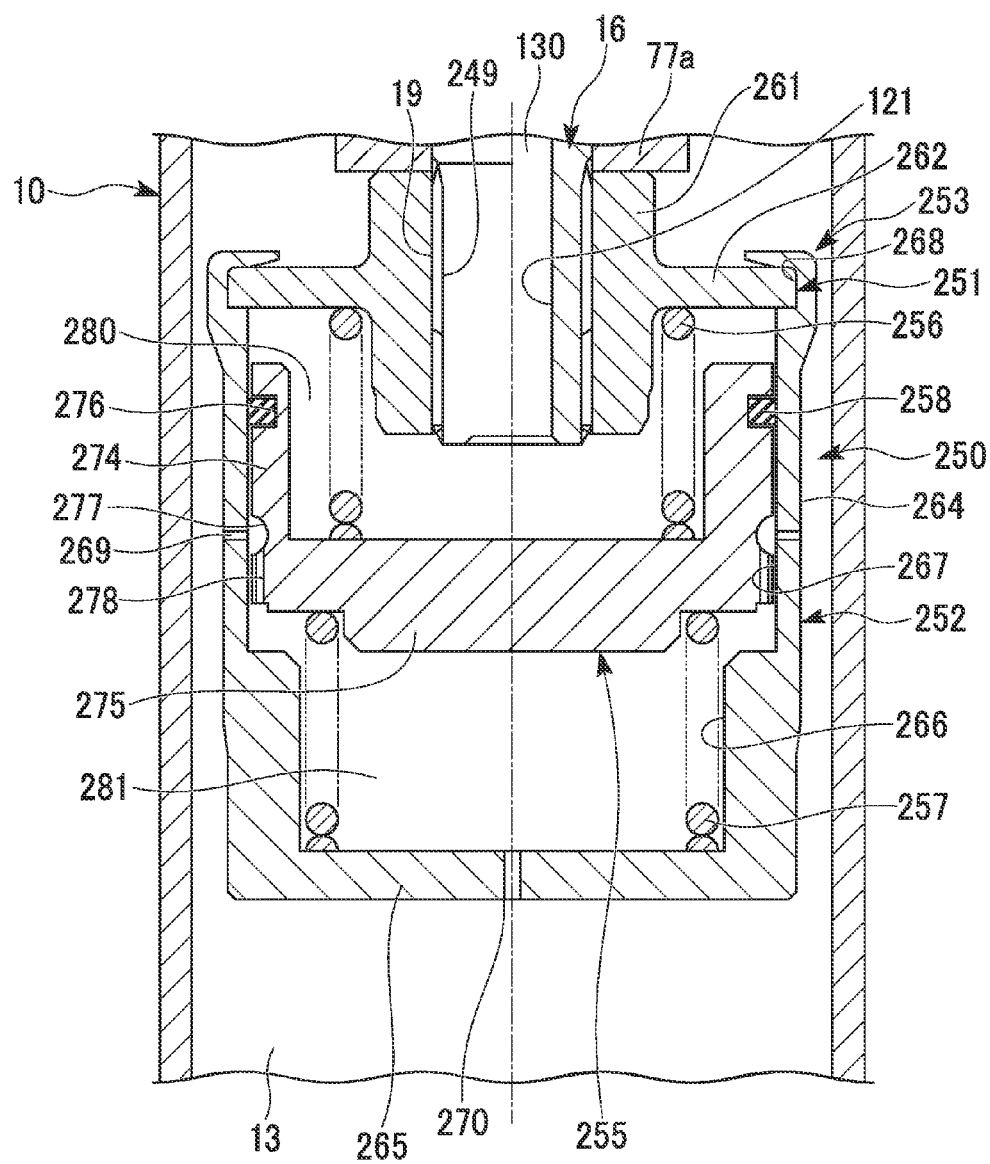
FIG. 16 is a cross-sectional view showing major parts of a shock absorber in accordance with a fifth embodiment of the present invention.

A portion surrounded by the free piston 255, the cylindrical portion 264 of the housing main body 252, the cover member 251 and the seal ring 258 to communicate with the passage hole 121 configures a pressure chamber 280 in communication with the upper chamber 12 (not shown in FIG. 16). A portion surrounded by the free piston 255, the bottom portion 265 side of the housing main body 252 and the seal ring 258 configures a lower chamber communication chamber 281 in communication with the lower chamber 13 via the orifice 270.

In the damping force varying mechanism 250 of the fifth embodiment, for example, in the extension stroke, when the hydraulic fluid of the upper chamber 12 side is introducible into the pressure chamber 280 via the passage 130, the hydraulic fluid is discharged to the lower chamber 13 by the following actions. That is, according to an increase in pressure of the upper chamber 12 and a decrease in pressure of the lower chamber 13, the coil spring 256 of the upper chamber 12 side in the axial direction is extended; the free piston 255 is moved toward the lower chamber 13 in the axial direction with respect to the housing 253 while compressing the coil spring 257 of the lower chamber 13 side in the axial direction; the hydraulic fluid of the upper chamber 12 side is introduced into the pressure chamber 280; and the hydraulic fluid is discharged to the lower chamber 13 from the lower chamber communication chamber 281 via the orifice 270.

In addition, in the compression stroke, when the hydraulic fluid is dischargeable to the upper chamber 12 side from the pressure chamber 280 via the passage 130, the hydraulic fluid is discharged to the upper chamber 12 by the following actions. That is, according to an increase in pressure of the lower chamber 13 and a decrease in pressure of the upper chamber 12, the coil spring 257 of the lower chamber 13 side in the axial direction is expanded; the free piston 255 is moved toward the upper chamber 12 side in the axial direction while compressing the coil spring 256 in the upper chamber 12 side in the axial direction; the hydraulic fluid of the lower chamber 13 side is introduced into the lower chamber communication chamber 281 via the orifice 270; and the hydraulic fluid of the pressure chamber 280 is discharged to the upper chamber 12 side via the passage 130.

According to the fifth embodiment, since a resistance occurs against the displacement of the free piston 255 by the coil springs 256 and 257, durability can be improved.

According to the above-mentioned embodiments, the shock absorber includes the cylinder in which a working fluid is hermetically contained, the piston slidably inserted in the cylinder and configured to partition the inside of the cylinder into two chambers, the piston rod connected to the piston and extending to the outside of the cylinder, the elastic member installed in the cylinder and configured to elastically act on the piston rod to suppress full extension of the piston rod, the first passage configured to communicate the two chambers to flow the working fluid therebetween by movement of the piston, and the second passage in communication with one of the two chambers. The first passage has the damping valve configured to suppress a flow of the working fluid generated by movement of the piston to generate the damping force. The second passage has the variable orifice having the area adjusted by the elastic member when the piston rod moves in the extension direction, the pressure chamber installed in series with the variable orifice, and the free piston configured to vary the volume of the pressure chamber by movement of the piston. That is, in the configuration in which the free piston configured to vary the volume of the pressure chamber by movement of the piston is installed at the second passage in communication with the one chamber to vary the damping force in response to the frequency, the variable orifice having the area varied by the elastic member is installed at the second passage. Accordingly, strength of the function of varying the damping force in response to the frequency can be adjusted. As a result, damping force characteristics can be more precisely controlled.

In addition, the variable orifice is adjusted to reduce the area by the elastic member when the piston rod moves in the extension direction. Accordingly, as the biasing force of the elastic member is increased, entrance and exit of the working fluid with respect to the pressure chamber can be regulated. As a result, as the biasing force of the elastic member is increased, a large amount of working fluid can flow to the first passage in which the damping valve is installed, and the damping force can be increased.

Further, the variable orifice is adjusted to increase the area by the elastic member when the piston rod moves in the extension direction. Accordingly, as the biasing force of the elastic member is increased, entrance and exit of the working fluid with respect to the pressure chamber can be increased. As a result, the strength of the function of varying the damping force in response to the frequency can be adjusted.

Furthermore, the damping valve has the configuration in which the first damping valve having the first fixed orifice and the second damping valve having the second fixed orifice are disposed in series, and the downstream side of the variable orifice communicates between the first damping valve and the second damping valve. Accordingly, since an amount of the working fluid introduced between the first damping valve and the second damping valve, which are disposed in series, can be adjusted by the variable orifice, valve-opening characteristics of the damping valve can be varied.

While the above embodiments have described an example in which the present invention is applied to a mono-tube type hydraulic shock absorber, the embodiments are not limited thereto but may use a double cylinder type hydraulic shock absorber in which an outer tube is installed at an outer circumference of the cylinder and a reservoir is installed between the outer tube and the cylinder or may be applied to any shock absorbers. In addition, in the case of the double cylinder type hydraulic shock absorber, as a bottom valve in communication with the lower chamber and the reservoir is installed at the bottom of the cylinder and the housing is provided at the bottom valve, the present invention can be applied to the bottom valve. Further, when an oil passage in communication with the cylinder is installed at the outside of the cylinder and the damping force generating mechanism is installed at the oil passage, the housing is installed at the outside of the cylinder.

In addition, in the above embodiments, while the hydraulic shock absorber is exemplified, water or air may be used as a fluid.

Further, in the first to fourth embodiment, while the two O-rings are exemplified, one or three O-rings or more may be used in the same technical spirit, according to necessity.

In addition, in the first to fourth embodiments, while the O-ring formed of a rubber (resin) material has been exemplified as the elastic body, a plurality of spheres formed of a rubber material may be provided in a circumferential direction at predetermined intervals, and further, the elastic body that can be used in the present invention may be formed of any material as long as the material has elasticity in plural axial directions, rather than one axial direction, in addition to the rubber material.

The exemplary embodiments of the present invention have been described above, but the present invention is not limited to the above embodiments. Addition, omission, replacement, and other alternation can be made in a range not departing from the gist of the present invention. The present invention is not limited to the above description and is confined only by the accompanying claims.

What is claimed is:

1. A shock absorber comprising:
   a cylinder in which a working fluid is hermetically contained;
   a piston slidably inserted into the cylinder and configured to partition the inside of the cylinder into first and second chambers;
   a piston rod connected to the piston and extending to the outside of the cylinder via the first chamber;
   an elastic member installed in the cylinder and configured to elastically act on the piston rod to suppress full extension of the piston rod;
   a first passage configured to communicate the first and second chambers to flow the working fluid therebetween by movement of the piston; and
   a second passage in communication with the first chamber,
   wherein the first passage comprises a damping valve configured to suppress a flow of the working fluid generated by movement of the piston to generate a damping force,
   the second passage comprises a variable orifice having an area adjusted by the elastic member when the piston rod moves in an extension direction, a housing installed in series with the variable orifice, and a free piston slidably provided in the housing, and
   a first side of the housing closer to a first side of the free piston is connected to the second passage to form a pressure chamber, and a second side of the housing closer to a second opposite side of the free piston communicates with the second chamber.

2. The shock absorber according to claim 1, wherein the variable orifice is adjusted such that the area is reduced by the elastic member when the piston rod moves in the extension direction.

3. The shock absorber according to claim 1, wherein the variable orifice is adjusted such that the area is increased by the elastic member when the piston rod moves in the extension direction.

4. The shock absorber according to claim 1, wherein the damping valve has a configuration in which a first damping valve having a first fixed orifice and a second damping valve having a second fixed orifice are disposed in series, and a downstream side of the variable orifice communicates between the first damping valve and the second damping valve.

\* \* \* \* \*